(12) United States Patent
Damberg et al.

(10) Patent No.: US 10,003,776 B2
(45) Date of Patent: Jun. 19, 2018

(54) EFFICIENT, DYNAMIC, HIGH CONTRAST LENSING WITH APPLICATIONS TO IMAGING, ILLUMINATION AND PROJECTION

(71) Applicant: MTT INNOVATION INCORPORATED, Vancouver (CA)

(72) Inventors: Gerwin Damberg, Vancouver (CA); James Gregson, Vancouver (CA); Wolfgang Heidrich, Thuwal (SA)

(73) Assignee: MTT Innovation Incorporated, Vancouver (CA)

( * ) Notice: Subject to any disclaimer, the term of this patent is extended or adjusted under 35 U.S.C. 154(b) by 0 days. days.

(21) Appl. No.: 15/368,021

(22) Filed: Dec. 2, 2016

(65) Prior Publication Data
US 2017/0085846 A1  Mar. 23, 2017

Related U.S. Application Data

(63) Continuation of application No. PCT/CA2015/050515, filed on Jun. 3, 2015.
(Continued)

(51) Int. Cl.
*H04N 9/31* (2006.01)
*G02B 26/06* (2006.01)
(Continued)

(52) U.S. Cl.
CPC .......... *H04N 9/3161* (2013.01); *G02B 26/06* (2013.01); *G02B 27/18* (2013.01); *G03B 21/006* (2013.01);
(Continued)

(58) Field of Classification Search
CPC .. H04N 9/3161; H04N 9/3185; H04N 9/3155; H04N 9/3188; H04N 5/74;
(Continued)

(56) References Cited

U.S. PATENT DOCUMENTS

| 6,011,874 A  * | 1/2000 | Gluckstad .............. G02B 27/52 359/559 |
| 2005/0063032 A1 | 3/2005 | Igasaki et al. |
| 2009/0128875 A1 | 5/2009 | Christmas et al. |

FOREIGN PATENT DOCUMENTS

| CN | 103325129 A | 9/2013 |
| EP | 0829747 A1 | 3/1998 |

OTHER PUBLICATIONS

Berry, M., "Oriental magic mirrors and the Laplacian image", European Journal of Physics 27 (2006) 109-118.
(Continued)

*Primary Examiner* — Michael Teitelbaum
(74) *Attorney, Agent, or Firm* — Oyen Wiggs Green & Mutala LLP

(57) ABSTRACT

A new projector design combines one spatial light modulator that affects only the phase of the illumination, and one spatial light modulator that only affects its amplitude (intensity). The phase-only modulator curves the wavefront of light and acts as a pre-modulator for a conventional amplitude modulator. This approach works with both white light and laser illumination, generating a coarse image representation efficiently, thus enabling, within a single image frame, significantly elevated highlights as well as darker black levels while reducing the overall light source power requirements.

30 Claims, 20 Drawing Sheets

Related U.S. Application Data

(60) Provisional application No. 62/007,341, filed on Jun. 3, 2014, provisional application No. 62/118,945, filed on Feb. 20, 2015.

(51) Int. Cl.
  *G02B 27/18* (2006.01)
  *H04N 5/74* (2006.01)
  *G03B 21/00* (2006.01)

(52) U.S. Cl.
  CPC ............. *G03B 21/008* (2013.01); *H04N 5/74* (2013.01); *H04N 9/3155* (2013.01); *H04N 9/3185* (2013.01); *H04N 9/3188* (2013.01)

(58) Field of Classification Search
  CPC ...... G02B 26/06; G02B 27/18; G03B 21/006; G03B 21/008
  See application file for complete search history.

(56) References Cited

OTHER PUBLICATIONS

Bimber, O. et al., "Superimposing Dynamic Range", The Eurographics Association 2009.
Buckley, E., "Invited Paper: Holographic Laser Projection Technology", Proc. SID, vol. 39, 1074-1079, 2008.
Damberg, G. et al., "High Dynamic Range Projection Systems", Proc. SID, vol. 38, Wiley Online Library, 4-7, 2007.
Damberg, G. et al., "High-Dynamic Range Projector", Siggraph Emerging Technologies, 2007.
Finckh, M. et al., "Geometry Construction from Caustic Images", Proc. ECCV, 464-477, 2010.
Haugen, P. R. et al., "Image formation by multifacet holograms", Applied Optics 22, 18, 2822-2829, 1983.
Holoeye, Photonics corporation, URL http://www.holoeye.com, Mar. 2015.
Hoskinson, R. et al., "Light Reallocation for High Contrast Projection Using an Analog Micromirror Array", ACM Transactions on Graphics 29, 6, 165, 2010.
Hoskinson, R. et al., "Arrays of large-area, tip/tilt micromirrors for use in a high-contrast projector", Sensors and Actuators A: Physical 173, 1, 172-179, 2012.
Hullin, M. B. et al., "State of the Art in Computational Fabrication and Display of Material Appearance", Eurographics Annual Conference (STAR), 2013.
Kiser, T. et al., "Architectural Caustics—Controlling Light with Geometry", Advances in Architectural Geometry 2012, Springer, 91-106, 2013.
Kusakabe, Y. et al., "A high-dynamic-range and high-resolution projector with dual modulation", vol. 7241, 72410Q-72410Q-11, 2009.
Lesem, L. et al., "The Kinoform: A New Wavefront Reconstruction Device", IBM Journal of Research and Development 13, 2, 150-155, 1969.
Menn, S. et al., "Advances in MEMS Deformable Mirror Technology for Laser Beam Shaping", Proc. of SPIE, vol. 6663, 2007.
Minano, J. C. et al., "Free-Form Optics for Illumination", Optical Review 16, 2, 99-102, 2009.
Ng, M. K. et al., "A Fast Algorithm for Deblurring Models with Neumann Boundary Conditions", SIAM Journal on Scientific Computing 21, 3, 851-866, 1999.
docs.nvidia.com/cuda, Programming guide, cusparse, cublas, and cufft library user guides, Online, Mar. 2015.
Papas, M. et al., "Goal-based Caustics", Eurographics, vol. 30, No. 2, 503-511, 2011.
Papas, M. et al., "The Magic Lens: Refractive Steganography", ACM Transactions on Graphics (TOG) 31, 6, 186, 2012.
Parikh, N. et al., "Proximal algorithms", Foundations and Trends in Optimization, vol. 1, No. 3, 2-7, 2014, pp. 142-143.
Pauly, M. et al., "Caustic Art", EPFL Tech. rep, 2012.
Rempel, A.G. et al., "Video Viewing Preferences for HDR Displays Under Varying Ambient Illumination", Proc. APGV, 45-52, 2009.
Rempel, A. et al., "The Role of Contrast in the Perceived Depth of Monocular Imagery", Proc. APGV, 115, 2011.
Robinson, M. D. et al., Polarization Engineering for LCD Projection, vol. 4. John Wiley & Sons, 2005, pp. 105-128.
Schwartzburg, Y. et al., "High-contrast Computational Caustic Design", ACM Trans. Graph. vol. 33, No. 4, 2014.
Seetzen, H. et al., "High Dynamic Range Display Systems", ACM Trans. Graph., 760-768, 2004.
Seetzen, H., "High dynamic range display and projection systems", PhD thesis, University of British Columbia, 2009.
Silvester, D. J. et al., "A Black-Box Multigrid Preconditioner for the Biharmonic Equation", BIT Numerical Mathematics 44, 1, 151-163, 2004.
Slinger, C. et al., "Computer-Generated Holography as a Generic Display Technology", IEEE Computer 38, 8, 46-53, 2005.
Tang, X. H. et al., "An Operator Splitting Scheme for Biharmonic Equation with Accelerated Convergence", Proceedings of the 5th International Conference on Large-Scale Scientific Computing, Springer-Verlag, Berlin, Heidelberg, LSSC'05, 387-394, 2006.
Yue, Y. et al., "Pixel Art with Refracted Light by Rearrangeable Sticks", Eurographics, vol. 31, No. 2, 575-582, 2012.
Yue, Y. et al., "Poisson-Based Continuous Surface Generation for Goal-Based Caustics", ACM Trans. Graph, vol. 33, No. 3, 2014.
Zhao, J., "Convergence of V-Cycle and F-Cycle Multigrid Methods for the Biharmonic Problem Using the Morley Element", Electronic Transactions on Numerical Analysis 17, 112-132, 2004.
Lazarev, G. et al., "LCOS Spatial Light Modulators: Trends and Applications", Optical Imaging and Metrology: Advanced Technologies, First Edition, 2012.
Hahn, J. et al., "Optical implementation of interative Fourier transform algorithm using spatial light modulator", Proceedings Optical Diagnostics of Living Cells II, vol. 6310, Aug. 29, 2006, pp. 63100B.

\* cited by examiner

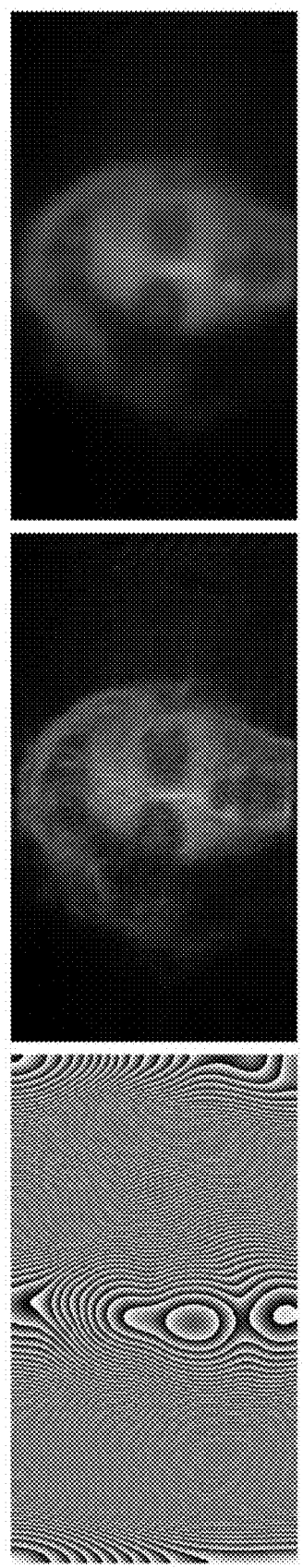

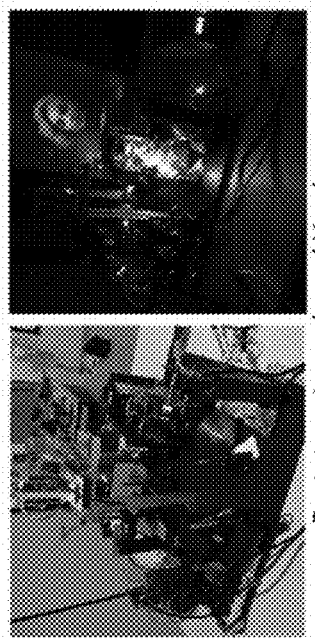
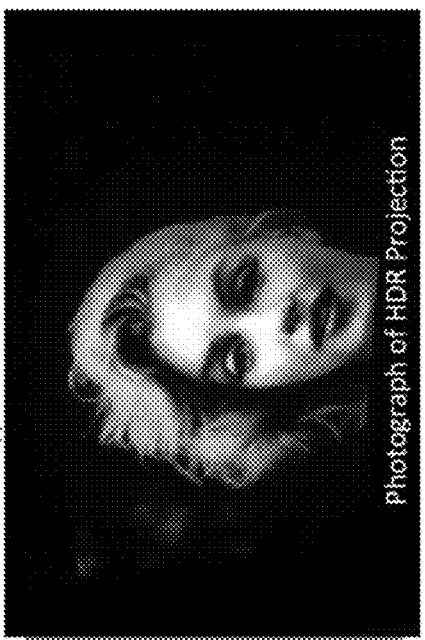
FIG. 11B
FIG. 11C
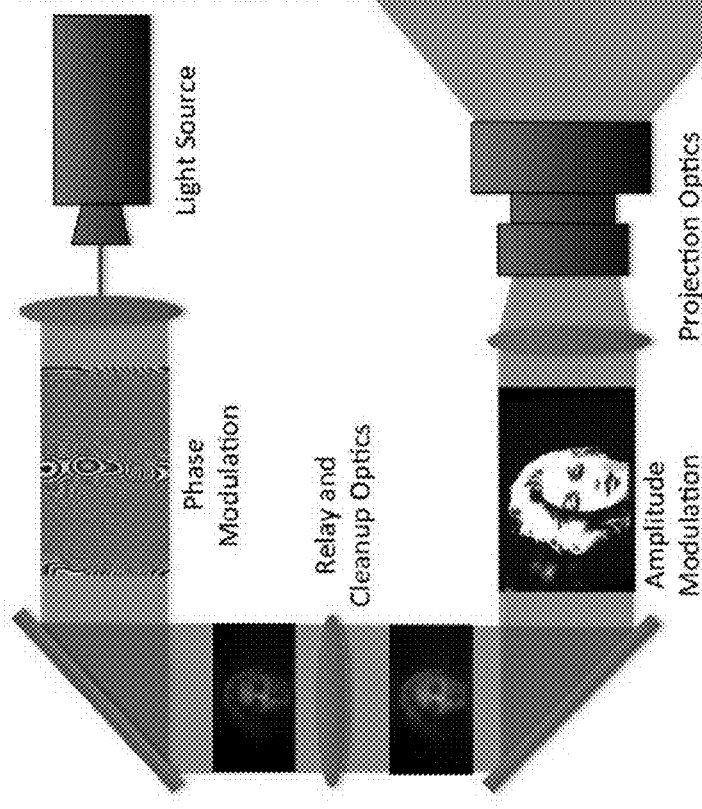
FIG. 11A

FIG. 13A  Padded target
FIG. 13B  Without padding
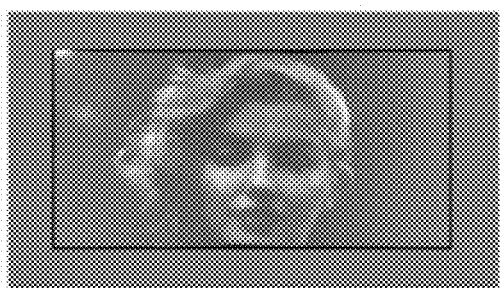
FIG. 13C  Mirrored padded

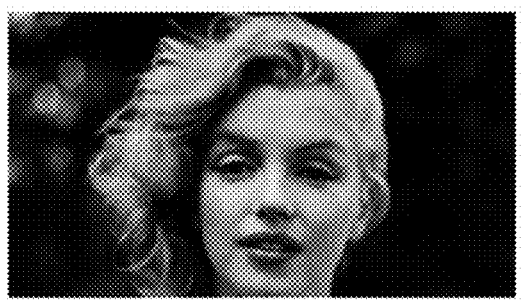
FIG. 14A  target
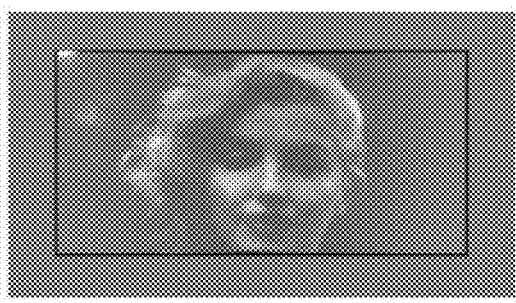
FIG. 14B  $\alpha = 2.0$
FIG. 14C  $\alpha = 0.2$
FIG. 14D  $\alpha = 0.02$

EFFICIENT, DYNAMIC, HIGH CONTRAST LENSING WITH APPLICATIONS TO IMAGING, ILLUMINATION AND PROJECTION

CROSS-REFERENCE TO RELATED APPLICATIONS

This application is a continuation of PCT International Application No. PCT/CA2015/050515 filed 3 Jun. 2015. PCT International Application No. PCT/CA2015/050515 claims priority from U.S. Patent Application No. 62/007,341 filed 3 Jun. 2014 and U.S. Patent Application No. 62/118,945 filed 20 Feb. 2015. For purposes of the United States, this application claims the benefit under 35 U.S.C. § 119 of U.S. Patent Application No. 62/007,341 filed 3 Jun. 2014 entitled DYNAMIC FREEFORM LENSING WITH APPLICATIONS TO HIGH DYNAMIC RANGE PROJECTION and U.S. Patent Application No. 62/118,945 filed 20 Feb. 2015 entitled EFFICIENT, NUMERICAL APPROACHES FOR HIGH CONTRAST FREEFORM LENSING, both which are hereby incorporated herein by reference for all purposes.

TECHNICAL FIELD

This invention relates to generating desired patterns of light. In some embodiments the desired patterns of light correspond to images specified by image data. Specific embodiments provide methods for controlling a free-form lens such as a phase-shifting light modulator, a variable mirror, or the like to achieve a desired distribution of light. Other embodiments provide projectors for projecting light.

BACKGROUND

Both light efficiency and dynamic range are major concerns for commercial projector designs. High contrast and peak luminance are vital for higher perceived image quality (brightness, colorfulness) [Rempel et al. 2009], even if most images only require a small amount of localized very bright highlights above their average picture level in order to appear realistic [Rempel et al. 2011]. On the other hand, an optical system should be highly efficient to minimize power consumption, and simplify thermal management. The latter concern makes it impractical to achieve very high peak brightness by boosting the power of a projector light source.

Amplitude spatial light modulators (or SLMs) are often used to create tones and colors in images by pixel-selectively blocking light. Such SLMs tend to be optically inefficient since blocked light is absorbed.

HDR (high dynamic range) image projection may be achieved by providing two or more stages of light modulators (Hoskinson et al.). Many light modulators (e.g. LCD panels) generate a desired light field by subtraction (i.e. by absorbing unwanted light). Some efforts have been made to create desired light fields by reallocating light. However, many available light reallocation technologies have significant disadvantages. For example, some require laser light, which can result in laser speckle. Some are very computationally intensive. Some require very high spatial frequency control of light which places demands on light modulators and also can result in artifacts caused by diffraction of light.

Freeform lenses, which can be aspherical, asymmetric lenses may be designed to generate specific caustic images under pre-defined illumination conditions [Finckh et al. 2010, Papa et al. 2011, Schwartzburg et al. 2014, Yue et al. 2014]. The caustic image is a redistribution or "reallocation" of light incident on the freeform lens [Hoskinson et al. 2010], Computer graphics approaches to designing such freeform lenses are known as goal-based caustics. Designing a freeform lens to achieve a particular desired image can be computationally intensive.

Freeform lenses may be applied for general lighting applications (e.g. [Minano et al. 2009]) and more specifically for goal-based caustics [Berry 2006, Hullin et al. 2013]. Some methods for designing freeform lenses apply discrete optimization methods that work on a pixelated version of the problem (e.g. [Papas et al. 2011, Papas et al. 2012, Papas et al. 2012]). Others optimize for continuous surfaces without obvious pixel structures (e.g. [Finckh et al. 2010, Kiser et al. 2013, Pauly and Kiser 2012, Schwartzburg et al. 2014, Yue et al. 2014]).

Holographic image formation models (e.g. [Lesem et al. 1969]) have been adapted to create digital holograms [Haugen et al. 1983]. Holographic projection systems have been proposed for research and specialty applications [Buckley 2008]. Many of these systems use diffraction patterns (or holograms) addressed on a phase SLMs in combination with coherent light (lasers) for image generation. While in principle an efficient way to form an image, the challenges in holography for projectors lie in achieving sufficiently good image quality, the limited diffraction efficiency achievable by binary phase modulators [Buckley 2008], and the requirement for a Fourier lens, often resulting in a bright DC spot within the active image area or reduced contrast throughout the image due to an elevated black level (in cases where the DC spot is expanded). Holographic projection generally requires coherent light.

The inventors have recognized a need for more efficient ways to design freeform lenses to achieve desired light patterns. In particular, the inventors have determined that sufficiently efficient design methods may be applied to provide real-time or near real time generation of dynamic freeform lenses. Such dynamic freeform lenses may, for example deliver video content or dynamically-changing light effects.

SUMMARY

This invention provides methods for controlling spatial light modulators to provide free-form lensing of light. The light may be projected and/or further modulated. Another aspect of the invention provides apparatus such as projectors, displays, illumination systems and their components that implement methods as described herein.

Dynamic freeform lenses may be applied in light projection systems. Such light projection systems may advantageously be light efficient, provide high (local) peak luminance, and high contrast (high dynamic range, HDR). Some embodiments employ a dynamic freeform lens, implemented on a phase only SLM. The phase only SLM may be combined with a conventional light blocking SLM such as a reflective LCD in a cascaded modulation approach. When controlled as described herein a phase modulator can create a smooth, but still quite detailed "caustic" image. Such a caustic image may be further modulated by an amplitude modulator if so desired. This approach may provide both a higher dynamic range and/or improved (local) peak luminance as compared to conventional projectors.

This application describes inter alia:
  illumination systems and projectors in which a phase modulator is illuminated with (near-)collimated light and a phase pattern addressed on the phase modulator forms an image or desired light field with or without further optical elements;

a Fourier domain optimization approach for generating freeform lens configurations that is capable of high frame rates for dynamic light steering using phase modulators;

real time freeform lensing algorithms and their applications in illumination systems, projectors and video/image processing systems;

a dual-modulation projector design that combines a phase modulator and an amplitude modulator for image generation and is capable of working with broadband light as well as monochromatic light (such as laser light).

An example freeform lens optimization approach is based on first-order (paraxial) approximations, which hold for long focal lengths and are widely used in optics. Under this linear model, the local deflection of light is proportional to the gradient of a phase modulation function, while the intensity is proportional to the Laplacian. The phase modulation function can be solved for in the in the lens plane instead of the image plane, for example using optimization methods, to arrive at a very simple to implement method that optimizes directly for the phase function or the shape of a refractive lens, without requiring additional steps. This approach may be solved very efficiently in the Fourier domain. In some embodiments the algorithm is efficient enough for on-the fly computation of freeform lensing configurations for reproducing video sequences.

One example aspect provides a dual-modulation projector design, in which one spatial light modulator that affects only the phase of the illumination is combined with one spatial light modulator that affects its amplitude (intensity). The phase-only modulator curves the wavefront of light reflected off it, and acts as a pre-modulator for a conventional amplitude modulator. This approach works with both white light and laser illumination, generating a coarse image representation without significant loss of energy.

The dual-modulation HDR projector design uses the freeform lens optimization approach to provide energy efficient high dynamic range and high intensity projection. This approach is capable of using white light (or other broadband light) illumination as well as coherent laser light. Use of broadband light can yield a significant improvement in image quality by eliminating laser speckle and averaging out other diffraction artifacts. A real-time implementation of a high resolution freeform lens enables applications such as video processing. A dual-modulation HDR projector may be constructed entirely from robust components that are currently commercially available.

In some embodiments the phase modulator creates a smoothed, but still quite detailed "caustic" image on the amplitude modulator. Since the caustic image merely redistributes, or "reallocates", light this approach produces both a higher dynamic range as well as an improved (local) peak brightness, compared to conventional projectors that modulate light using a single amplitude modulator.

Some embodiments apply a linear model in which the local deflection of light is proportional to the gradient of a phase modulation function, while the intensity is proportional to the Laplacian.

Some embodiments combine application of this model with a parameterization of the optimization problem in the lens plane instead of the image plane to arrive at a very simple to implement method that optimizes directly for the phase function or the shape of a refractive lens, without any additional steps. Although the objective function is non-convex due to an image warping operator convergence can typically be achieved within a few iterations.

Technology as described herein has application in controlling dynamic freeform lenses, for example in the context of light efficient, high (local) peak brightness, and high contrast (high dynamic range, HDR) projection systems.

Some aspects of the invention provide algorithms which may be applied to efficiently determine phase patterns for a phase modulator to cause a desired light profile in the image plane. In some embodiments a (near) one-to-one relationship is established between the phase at a location in the lens plane and a corresponding area of the image plane. This is in contrast to the diverging or converging rays or beams that are required for traditional holographic approaches.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

FIGS. 10A, 10B, and 10C: From left to right correlating to positions A to C in FIG. 8: A: phase pattern present at phase-only LCoS modulator, B: a direct image produced by lens in intermediary image plane (prior to diffuser) and C: intensity distribution present at amplitude LCoS modulator after having passed through a thin-film light-shaping diffuser.

FIGS. 11A, 11B, and 11C show an example high-dynamic range projection system based on dual modulation. A first stage modulates the source illumination phase to form a coarse intermediate image. This is followed by an amplitude modulation stage that forms the final image. Using phase modulation results in greater contrast and darker black-levels than conventional projection since light is redistributed rather than blocked.

FIGS. 13A, 13B, and 13C: By mirror-padding the input image, pure-Neumann boundary conditions at the image edge can be achieved while retaining a Toeplitz matrix structure. This prevents distortions of the image boundary. Simulated results with LuxRender™.

FIGS. 14A, 14B, 14C, and 14D: LuxRender raytracing simulations: the smoothness parameter α penalizes strong caustics in the image that achieve high-brightness but poor image quality.

DETAILED DESCRIPTION

Figure 1:
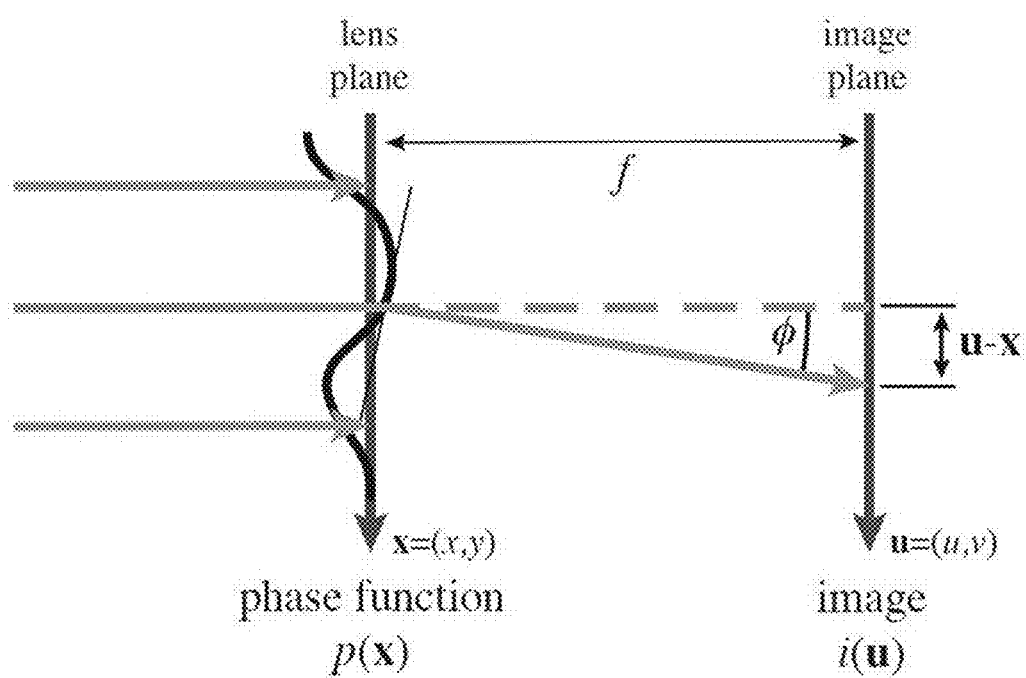
FIG. 1 is a schematic illustration of an example geometry for image formation. Phase modulation takes place in the lens plane, which is placed at a focal distance of f from the image plane. This results in a curvature of the wavefront, represented by a phase function p(x).

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Freeform Lensing

Some embodiments provide a new approach to determining a lens shape or phase function that can provide a desired light field when illuminated. The output of this approach may be applied to control a phase modulator or variable lens or variable mirror to yield the desired light field.

In displays according to some embodiments, phase-only SLMs are used as programmable freeform lenses. The lenses may be illuminated with broadband light (e.g. white light). This eliminates speckle, while at the same time the spatial smoothness of the lens modulation patterns reduces diffraction artifacts. Any remaining diffraction is averaged out by the broadband nature of the illumination, resulting only in a small amount of blur that can be modeled and compensated for in a dual-modulation setting Some embodiments optimize directly for the phase function, or, equivalently, the lens shape, without a need for a subsequent integration step. This is facilitated by a parameterization of the problem that expresses the optimization directly in the lens plane rather than the image plane. This leads to a much simpler formulation of the freeform lens optimization problem than the approaches described in the literature.

Phase Modulation Image Formation

This application relates in part to methods for displaying desired light patterns by using a modulator that does not absorb much light, but moves it around within the image plane. In this way, light can be reallocated from dark image regions to bright ones. For example the modulator may be controlled to provide moving, bright spots of light. An example of a modulator suitable for this application is a LCoS SLM operated in a phase-only fashion. The SLM may have a suitable resolution such as 1, 2 5 or more megapixels. Control of the SLM may be achieved by optimizing a continuous phase function representing the required curvature of the wavefront of light as it passes through the SLM.

Apparatus and methods according to different embodiments allow the use of broadband light (e.g. from a lamp, LEDs, or arrays of lasers with different wavelengths) as well as monochromatic laser light. Phase modulating arrays such as liquid crystal-based SLMs operated in a phase-only configuration are applied as programmable freeform lenses. Being able to use broadband illumination can help to eliminate screen speckle, while at the same time the spatial smoothness of the lens modulation patterns reduces other artifacts such as diffraction. Any remaining diffraction effects in the image plane can be averaged out by the broadband nature of the illumination, resulting only in a small amount of blur that can be easily modeled and compensated for by providing one or more additional modulators.

One way to optimize directly for the phase function (i.e. the shape of the wavefront in the lens plane), or, equivalently, the lens shape, without a need for a subsequent integration step involves a parameterization of the problem that allows us to express the optimization directly in the lens plane rather than the image plane.

To derive the image formation model for a phase modulation display, we consider the geometric configuration shown in FIG. 1: a lens plane and an image plane (e.g. a screen) are placed parallel to each other at focal distance f.

Collimated light is incident at the lens plane from the normal direction. A phase modulator (or lens) in the lens plane distorts the phase of the light, resulting in a curved phase function p(x), which corresponds to a local deflection of the light rays. In a related embodiment, a variable mirror is provided in the lens plane.

The effects of phase delays introduced by a smooth phase function can be related to an equivalent, physical refractive lens under the paraxial approximation, which can be derived using either geometric optics or from the Hyugens principle. The paraxial approximation holds when $\sin\theta \approx \theta$. For a projection system in which $|\theta| \leq 12°$, (in this example the full range corresponds to redirecting light from one side of the image to the other) the error in the paraxial approximation is less than 1%. This facilitates optimizing directly for the phase surface.

Using the simple paraxial approximation $\sin\varnothing \approx \varnothing$, which is valid for small deflection angles, it is possible to show that the geometric displacement in the image plane is proportional to the gradient of the phase function.

With the paraxial approximation $\sin\phi \approx \phi$, which is valid for small deflection angles, we obtain in 2D that $$\mu - x = f \cdot \sin\phi \approx f \cdot \frac{\partial p(x, y)}{\partial x}. \qquad (1)$$

In 3D this leads to the following equation for the mapping between a point x on the lens plane and a corresponding point u on the image plane:

$$u(x) = x + f \cdot \nabla p(x). \qquad (2)$$

Intensity Modulation

With the above mapping, we can derive the intensity change associated with this distortion. Let dx be a differential area on the lens plane, and let $du = m(x) \cdot dx$ be the differential area of the corresponding region on the image plane, where m(.) is a spatially varying magnification factor. The intensity on the image plane is then given as $$i(u(x)) = \frac{dx}{du} i_0 = \frac{1}{m(x)} i_0, \qquad (3)$$

where $i_0$ is the intensity of the collimated light incident on the lens plane. In the following we will assume $i_0 = 1$ for simplicity of notation. This corresponds to uniform illumination of the lens plane.

Figure 2:
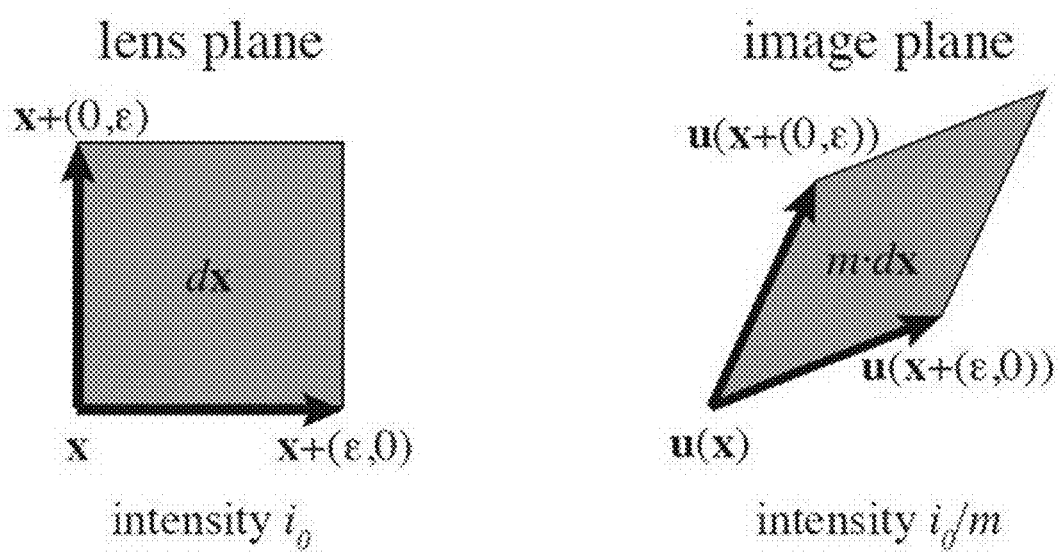
FIG. 2 is a schematic illustration showing intensity change due to the distortion of a differential area dx.

The magnification factor m(.) can be expressed in terms of the derivatives of the mapping between the lens and image planes (also see FIG. 2):

$$m(x) = \left(\frac{\partial}{\partial x} u(x)\right) \times \left(\frac{\partial}{\partial y} u(x)\right) \qquad (4)$$

$$\approx 1 + f \frac{\partial^2}{\partial x^2} p(x) + f \frac{\partial^2}{\partial y^2} p(x)$$

$$= 1 + f \cdot \nabla^2 p(x).$$

This yields the following expression for the intensity distribution on the image plane:

$$i(x + f \cdot \nabla p(x)) = \frac{1}{1 + f \cdot \nabla^2 p(x)}. \qquad (5)$$

In other words, the magnification, m, and therefore the intensity i(u) on the image plane can be directly computed from the Laplacian of the scalar phase function on the lens plane.

Optimization Problem

While it is possible to directly turn the image formation mode from Equation 5 into an optimization problem, we found that we can achieve better convergence by first linearizing the equation with a first-order Taylor approximation, which yields $$i(x+f\cdot\nabla p(x))\approx 1-f\cdot\nabla^2 p(x), \quad (6)$$

where the left hand side can be interpreted as a warped image $i_p(x)=i(x+f\cdot\nabla p(x))$ where the target intensity i(u) in the image plane has been warped backwards onto the lens plane using the distortion u(x) produced by a given phase function p(x).

From this image formation model one can construct the following optimization problem for determining the phase function p(x) for a given target image i(u):

$$\hat{p}(x)=\text{argmin}_{p(x)}\int_x (i_p(x)-1+f\cdot\nabla^2 p(x))^2 dx \quad (7)$$

where $i_p$ is a warped image $i_p(x)=i(x+f\cdot\nabla p(x))$ where the target intensity i(u) in the image plane has been warped backwards onto the lens plane using the distortion u(x) produced by a given phase function p(x).

This optimization problem can be solved by iterating between updates to the phase function and updates to the warped image, as illustrated by the following example Algorithm 0:

---
Algorithm 0 Freeform lens optimization

// Initialization
$i_p^0 x = i(u)$
while not converged do
// phase update
$p^k(x) = \text{argmin}_{p(x)} \int_x (i_p^{(k-1)}(x) - 1 + f \cdot \nabla^2 p(x))^2 dx$
// image warp
$i_p^{(k)}(x) = i(x + f \cdot \nabla p^k(x))$
end while

---

After a straightforward discretization of i(.) and p(.) into pixels, the phase update corresponds to solving a linear least squares problem with a discrete Laplace operator as the system matrix. We can solve this positive semi-definite system using any one of a number of different algorithms, including Conjugate Gradient (CG), BICGSTAB and Quasi Minimal Residual (QMR). Such algorithms may be performed by a program. The image warp corresponds to a simple texture mapping operation, which can be implemented efficiently on a GPU (graphics processor unit).

Figure 4:
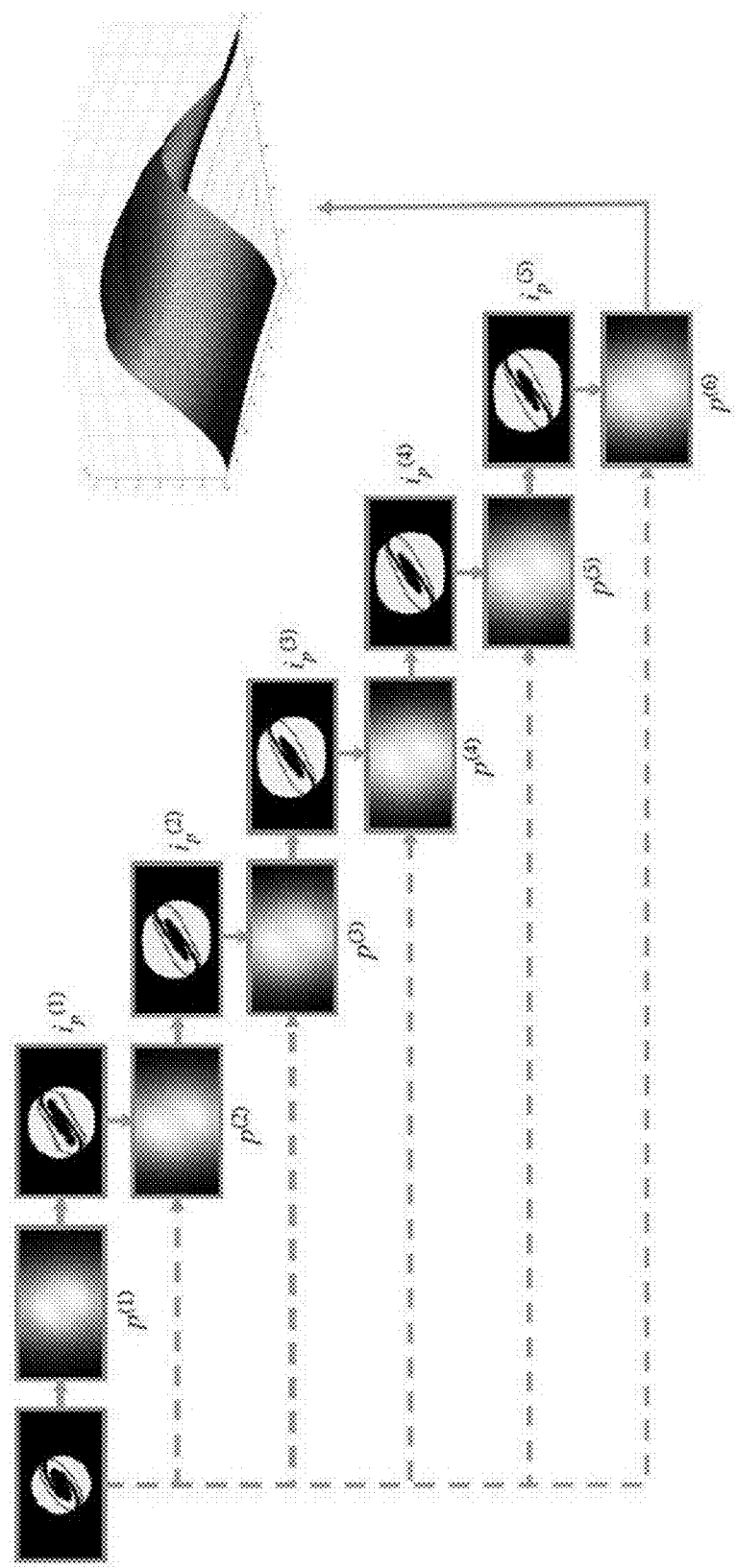
FIG. 4 shows stages in an algorithm for freeform lensing.

The convergence behavior of this algorithm is shown in FIG. 4 which shows algorithm stages for six iterations. The target image i gets progressively distorted through backwards warping onto the lens plane i~k) as the phase function p (k) converges towards a solution. The algorithm uses the undistorted target image to optimize an initial phase function. Using this phase function, we update the target image on the lens plane by backward warping the image-plane target. This process increasingly distorts the target image for the modulator plane as the phase function converges. Although the backward warping step implies a non-convex objective function, we empirically find that we achieve convergence in only a small number of iterations (5-10). Overall processing time can be further accelerated by processing lower image resolutions first and upsampling the result.

Solution in the Fourier domain

Convergence speed of this algorithm can be further improved by understanding that the computational cost of the method is due primarily to the solution of large-scale biharmonic problems. For example, a Krylov subspace method (QMR) may be employed however convergence is typically slow due to difficulties in finding an effective preconditioner and the scale of the systems. Algorithms useful for efficient solution of biharmonic systems are an ongoing topic of research, including, for example, preconditioning approaches [Silvester and Mihajlović 2004], multigrid methods [Zhao 2004] and operator splitting schemes [Tang and Christov 2006]. Scaling these to the millions of degrees of freedom required for imaging problems in real time is extremely challenging.

An alternative approach based upon proximal operators can allow the problem to be expressed in the Fourier domain and consequently solved efficiently using highly parallelizable fast Fourier transform libraries. This alternative approach permits solutions to be obtained in real time or near real time using commodity low cost data processors.

Figure 3:
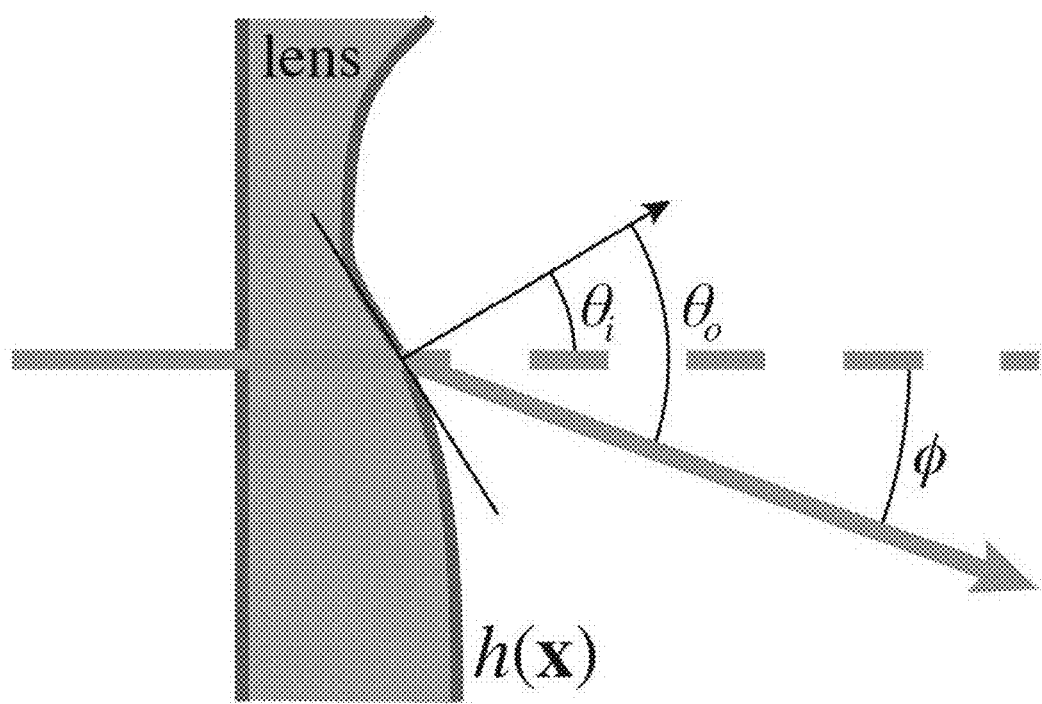
FIG. 3 is a schematic illustration showing a geometry for refraction in a freeform lens defined by a height field h(x).

Mirror padding the input image as described, for example, in [Ng et al. 1999] causes the system arising from the discretization of $\nabla^4$ to have periodic boundary conditions with pure-Neumann boundary conditions at the nominal image edge. This is illustrated in FIG. 3. This modification allows the product $\nabla^4 p$ in the objective function, Equation 7, to be expressed as a convolution via the Fourier convolution theorem, which allows much faster Fourier-domain solver to be used.

For periodic boundary conditions, this problem can be solved very efficiently in Fourier-space by using proximal operators. Proximal methods from sparse optimization allow for regularization to be imposed without destroying the structure of the system.

For an arbitrary convex function, F(z), the proximal operator, $\text{prox}_{\gamma F}$, (defined in Equation 8) acts like a single step of a trust region optimization in which a value of z is sought that reduces F but does not stray too far from the input argument q:

$$prox_{\gamma F}(q) = \text{argmin}_z F(z) + \frac{\gamma}{2} \|z - q\|_2^2. \quad (8)$$

For a least-squares objective $F(z)=\frac{1}{2}\|Az-b\|_2^2$, the resulting proximal operator is shown in Equation 9.

$$\text{prox}_{\gamma F}(q) = (\gamma + A^T A)^{-1}(\gamma q + A^T b) \quad (9)$$

Since proximal operators contain a strictly convex regularization term, the whole operator is a strictly convex function even if F is only weakly convex. This property of proximal operators helps in designing algorithms with rapid convergence. A straightforward fixed-point optimization algorithm, the proximal-point method [Parikh and Boyd 2013], exploits this to optimize strictly or weakly convex functions by repeatedly evaluating the proximal operator of the objective, i.e. $z^{k+1}=\text{prox}_{\gamma F}(z^k)$, until convergence to a minimizer of F. Since the proximal regularization term can also be expressed as a Toeplitz matrix (simply the identity matrix), it does not destroy the circulant structure of the problem nor does it alter the solution by imposing unneeded regularization.

By denoting the forward and inverse Fourier transforms as F( ) & $F^{-1}$( ) respectively, complex conjugation by * and performing multiplication and division point-wise, the proximal operator for Equation 7 can be re-expressed in the Fourier domain as Equation 10 for Toeplitz matrices A.

$$prox_{\gamma F}(q) = F^{-1}\left(\frac{F(b)F(A)^* + \gamma F(q)}{(1+\alpha)F(A)^2 + \gamma}\right) \quad (10)$$

The constant $\alpha \geq 0$ has been added to regularize the solver by favoring solutions with low curvature. This corresponds to solving a modified form of Equation 7 that imposes a penalty of $$\frac{\alpha}{2}\|\nabla^2 p(x)\|^2,$$

as shown in Equation 11

$$\hat{p}(x) = \mathrm{argmin}_{p(x)}\int_x (i_p(x)-1+f\cdot\nabla^2 p(x))^2 dx + \int_x (\nabla^2 p(x))^2 dx, \quad (11)$$

The effect of the parameter α is to favor smoother solutions than can otherwise be found. This helps to prevent the method from producing undesirable caustics in an attempt to achieve very bright highlights at the expense of image quality in darker regions. The effect of the a parameter is shown in FIG. 13 for simulations.

By defining $A=f\nabla^2$ and $b=1-i_p^k(x)$ and $q=p^k(x)$, the problem described above can be solved iteratively in Fourier space using Algorithm 1. This change allows each iteration of the non-linear solve to be computed using one forward/inverse Fourier transform, one image warping and some minor, component-wise operations. As shown, Equation 11 is a non-linear variant of a common proximal algorithm, the proximal-point method, which is a fixed-point algorithm for minimizing an arbitrary convex F consisting of recursively calling $prox_{\gamma F}$ by evaluating: $p^{k+1} \leftarrow prox_{\gamma F}(p^k)$.

---
Algorithm 1 Paraxial caustics in Fourier space
---
// Initialize phase surface as a constant value
$p^0(x) \leftarrow 0$
// Initialize iteration counter and constant parameters
$A \leftarrow f\nabla^2$
$k \leftarrow 0$
while $k < k_{max}$ do
   // Warp target image by current solution
   $i_p^k(x) \leftarrow i(x + f\nabla p^k(k))$
   // initialize right hand side of least-squares problem
   $b \leftarrow 1 - i_p^k(x)$
   // Update the current solution by evaluating
   // the proximal operator in Equation 7
   $p^{k+1}(x) = prox_{\gamma F}(p^k(x))$
   // update iteration index
   $k \leftarrow k + 1$
end while
// RETURN computed mapping
return $p^{k_{max}}(x)$

---

The re-formulation of the algorithm results in orders of magnitude speedup to the algorithm when executed on a CPU using FFT based solvers over the QMR solver described above. If the per-frame computation times for a QMR solver are 20 minutes or more the Fourier version in Algorithm 1 may take approximately 0.6 seconds at the same resolution (256×128) on a Core i5 desktop computer, a speedup of approximately 2000 times. The conversion to Fourier domain solves also results in operations that are more easily implemented to run in parallel on one or more GPUs. We have implemented the algorithm the algorithm both in C++ and in CUDA using CUFFT for the forward and inverse Fourier transforms [NVIDIA]. The CUDA & CUFFT version of the code yields nearly a 150 times speedup over the single-threaded CPU version when run on a GeForce 770 GPU, resulting in roughly a 300,000 fold speedup over the naive CPU version implemented using QMR. The algorithm described herein is the first freeform lensing method of which the inventors are aware that is capable of operating in real-time, see Table 1. This is in contrast to methods such as [Schwartzburg et al. 2014], which produce satisfactory results, but have runtimes roughly five orders of magnitude higher than our GPU algorithm. This currently prevents their use in real-time capable projection systems.

TABLE 1

Runtimes for various resolution inputs with 10 iterations of Algorithm 1

| Algorithm | Resolution | Runtime |
|---|---|---|
| CPU | 256 × 128 | 600 ms |
| GPU | 256 × 128 | 4 ms |
| GPU | 480 × 270 | 14 ms |
| GPU | 960 × 540 | 52 ms |
| GPU | 1920 × 1080 | 212 ms |

The algorithm is very well suited to hardware implementation on devices such as GPUs, FPGAs or ASICs due to its use of highly parallel FFTs and component-wise operations. We run Algorithm 1 for a fixed number of iterations (typically 10). Convergence to a solution is rapid, requiring well fewer than 10 iterations; however for hardware implementations it is highly desirable to have computation times that are independent of frame content. The choice of smoothing factor α can be somewhat content dependent.

Simulation Results

Figures 12A, 12B:
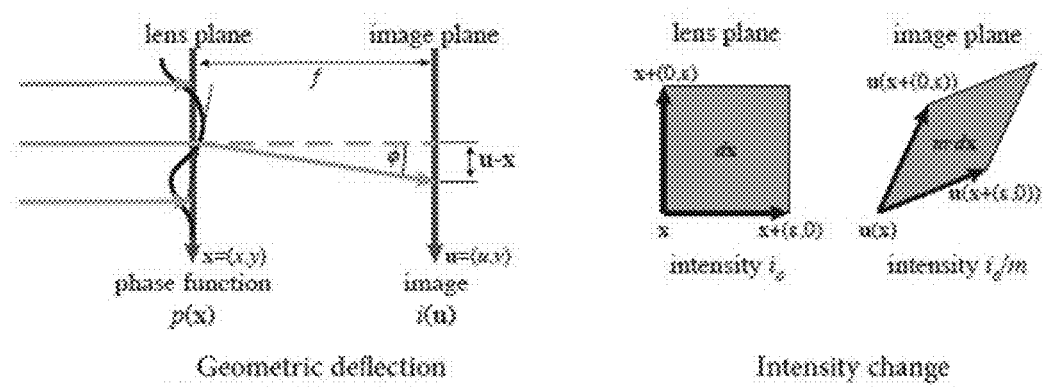
FIG. 12A shows geometry for the image formation model, with phase modulation p(x) taking place in the lens plane, and resulting deflections creating a caustic image on the image plane at distance f.
FIG. 12B shows the local intensity on the image plane is related to the change in the differential surface area between corresponding patches on the lens plane and the image plane.
Figure 15:
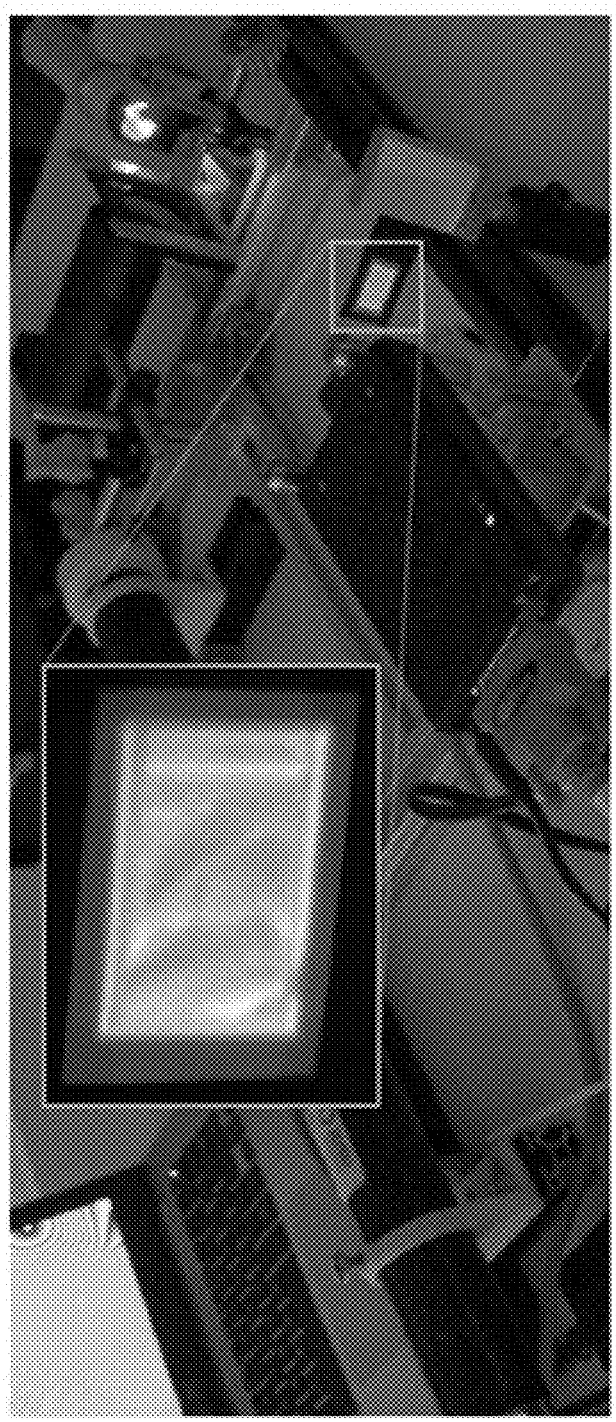
FIG. 15: Layout of a simple example dynamic lensing test setup for use with broadband light. A beam of light from a light source such as a white LED with collimation optics (a modified flash light) together with a linear polarization filter (provided for sensible use of the phase modulator) is reflected off the SLM operated in phase-only mode and onto a small projection screen facing the SLM at a 50 mm distance. The SLM in this setup was calibrated for a center wavelength of 550 nm. Due to light-engine power limitations, this setup was not sufficient to drive a dual-modulation setup (the reduced intensity also introduces camera capture noise in the inlay) although it illustrates that phase modulation is functional with broadband light. This paves the way for future broadband illumination phase+amplitude dual-modulation setups. Such setups could apply industry standard Xenon bulbs, cost effective blue laser+phosphor light sources or LEDs, for example as light sources.

Using the equivalence between physical lenses and phase functions allows solid lens models to be generated for testing via geometric optics simulation (we use Blender+LuxRender). Although these models may not satisfy the paraxial approximation, they serve well for quick qualitative comparisons since thickness effects tend to manifest as low-spatial frequency distortions. Examples are shown in FIGS. 12 and 13 which illustrate the effect of mirror padding and the choice of a respectively. It is important to note that these distortions do not affect the prototype projector results since the prototype meets the conditions of the paraxial approximation well.

Figure 18:
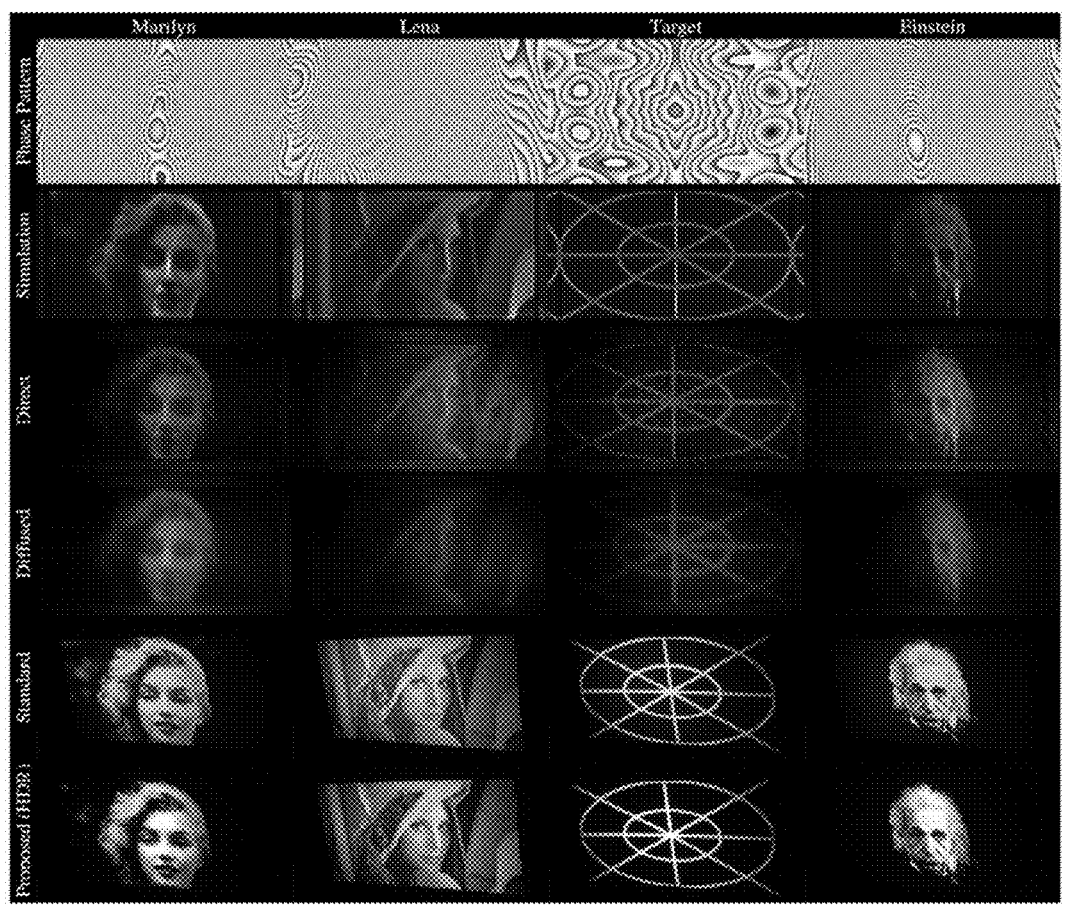
FIG. 18: Comparison of simulated and captured results from top to bottom by row. Phase Pattern: the phase pattern as computed by Algorithm 4.1. Simulation: Huygens-Fresnel simulation of predicted image. Direct: photograph of actual image without diffuser showing diffraction artifacts. Diffuser: by adding the a thin-film diffuser, artifacts such as diffraction fringes nearly completely mitigated. Standard: photo of standard, amplitude modulation only projection using a single amplitude modulator shows elevated black levels and low contrast. Proposed (HDR): Using our lensing approach redistributes light from dark regions to bright regions, resulting in improved black levels and increased highlight intensity. The last two rows appear slightly distorted due to an off-angle position of the camera which became necessary because of a short throw projection and close screen as well as baffles to block ambient light effectively to capture the black level of the system.
Figures 19A, 19B:
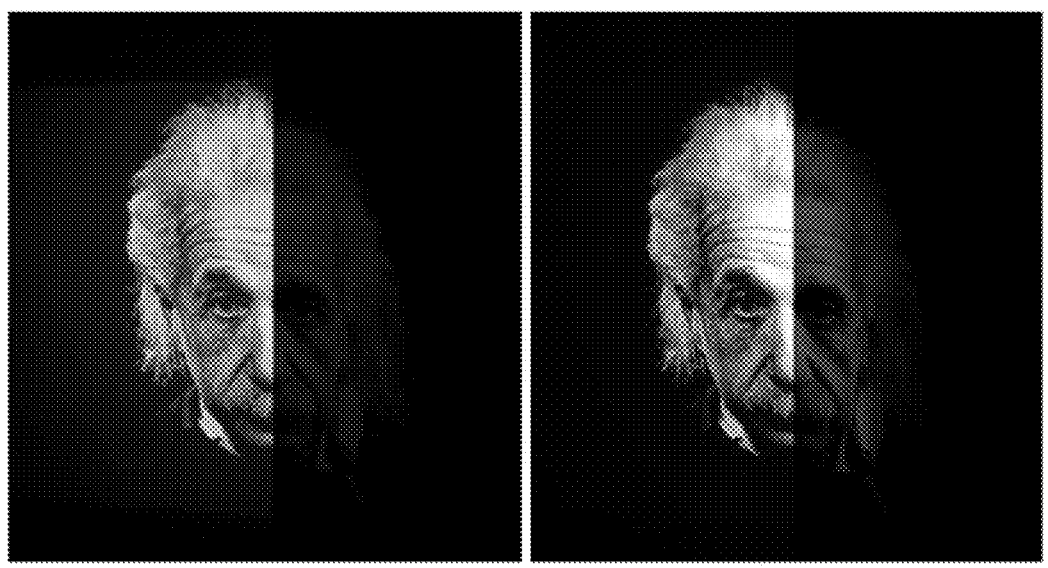
FIGS. 19A and 19B: Photos of a prototype projector in LDR comparison mode (left image) and HDR mode (right image). Left: light redistribution is active resulting in increased peak luminance and reduced black level. Right: LDR projector for comparison using the same hardware. In LDR mode a flat phase profile results in a uniform illumination profile at the amplitude attenuator (second SLM). Each image is vertically split to show a long exposure time on the left half (dark level detail is visible) and a short exposure on the right side (detail in the highlights is visible). Both exposures are of the same projected image on screen.

When higher physical accuracy is required, one can apply Huygens-Fresnel simulation, which approximates the (complex) incident illumination as a super-position of (complex) point sources. Simulation results are shown in FIGS. 18 and 20 and are in good agreement with experimentally observed results (see e.g. the caustics on Marilyn's nose in the 'Simulated' and 'Direct' images) although the increased cost of simulation limits resolution to below the levels needed to resolve diffraction effects from discrete pixels. Speckle from the laser light source is similarly not modeled.

Based on these results, we conclude that the phase modulation performs largely as expected, and the primary limitations in image quality are diffraction artifacts and speckle.

Static Refractive Lenses

The phase function p(x) can be used directly to drive a digital phase modulation display (see below). However, if instead, we would like to create a refractive lens surface out of a transparent material, then this phase function may be converted to a geometric model for the lens shape.

We can model a lens shape that is flat on one side and has a freeform height field h(x) on the other side (see FIG. 3). In the (x, z) plane, the deflection angle φ is related to the incident (✓i) and the exitant (θ$_o$) angles at the height field as follows $$\frac{\partial p(x)}{\partial x} \approx \phi = \theta_0 - \theta_i, \quad (12)$$

The analogous relationship holds in the (y, z) plane.

In addition, the lens material has a refractive index of n. Using Snell's law, and again the paraxial approximation, we obtain $$\frac{1}{n} = \frac{\sin\theta_i}{\sin\theta_o} \approx \frac{\theta_i}{\theta_o}, \quad (13)$$

Using Equations 12 and 13, as well as $\theta_r \approx \partial(x)/\partial x$, we can derive the lens shape as $$h(x) = h_0 + \frac{1}{n-1} p(x), \quad (14)$$

where h$_0$ is a base thickness for the lens.

The height h(x) is a linear function of the phase. The refractive index n shows up only as a scalar multiplier to the phase function p(.). Since p itself is approximately linear in the focus distance f, we can see that uniform scaling of the height field and uniform changes of the refractive index simply manifest themselves as a refocusing of the lens. This also shows that it is equivalently possible to adjust the example optimization procedure proposed above to directly optimize for h(.) instead of p(.). The formulation above may be preferable in cases where one is seeking to control only because a spatial phase modulator for example for applications in video projectors.

Figure 5A:
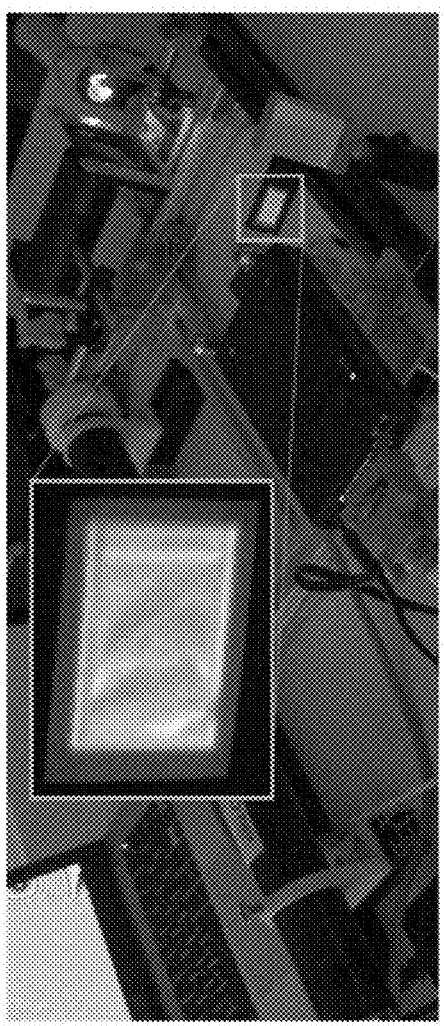
FIGS. 5A and 5B show a phase-only spatial light modulator being used to drive a projector display with white light. The same setup could also use laser illumination. This approach is particularly useful in energy-efficient dual modulation HDR projectors. The right hand image shows refractive lenses designed using the same free form lensing algorithm for goal-based caustics. For photography purposes, both results are shown on back-illuminated rather than front screens, so that the displayed 'Lena' image appears mirrored.
Figure 5B:
Figure 5E:
FIGS. 5C, 5D, and 5E show examples of refractive lenses produced using methods described herein.
Figure 5D:
Figure 5C:
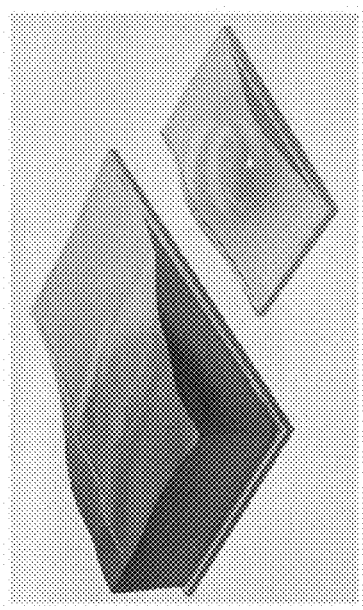

FIG. 5 and the right-hand image of FIG. 5A show some example 3D printed refractive lenses. In FIG. 5, the left image shows the lenses themselves, while the center and right images show the caustics generated by them (the Lena image and a Siggraph logo). Due to resolution limits on the 3D printer, the lens dimensions have been optimized for large feature scales, which results in a short focal length.

FIG. 5 and the right-hand image of FIG. 5A show results for goal-based caustics using refractive freeform lenses generated with our method. The lenses (shown on the left of FIG. 5) were 3D printed on an Objet Connex 260 rapid prototyping machine using VeroClear™ material. Afterwards, the lenses were thoroughly cleaned and the flat side was manually polished using fine grained sand paper and polishing paste. This type of 3D printer has a layer thickness of 42 μm, which limits the feature size that can be readily created.

As discussed above, the model can be rescaled to achieve different focal distances. To accommodate the resolution limits of the fabrication method, we chose very short focal distances f (about 1" for the Siggraph logo and 5" for the Lena image). Although these scales test the very limits of the paraxial approximation used in the derivation of our image formation model, the image quality is still quite good. With better fabrication methods such as injection molding, high precision milling or even detailed manual polishing of a 3D printed surface, one could both improve the image quality and reduce the feature size, so that far field projection becomes feasible.

Dynamic Lensing

In order to apply the freeform lens concept in projection displays, one may apply a spatial light modulator that can manipulate the shape of the wavefront of reflected or transmitted light. Several different technologies are available for this purpose.

Several adaptive optical devices lend themselves to the real-time video-capable implementation. Such devices include microelectromechanical systems (MEMS) based displays, such as the analog 2D array of mirrors fabricated by [Hoskinson et al. 2012], or deformable mirrors used in wavefront sensing and correction applications. Continuous deformable mirrors [Menn et al. 2007] seem a particularly attractive option since they eliminate diffraction due to regular pixel structures. Although functioning mirrors with as many 4096 actuators have been reported, the spatial resolution of these MEMS-based devices is still several order of magnitude lower than that of existing digital micro displays that are routinely used in digital projectors. This makes their use at this point, less attractive in a dual-modulation setup.

Some embodiments advantageously apply wavefront modulators based on liquid crystal display (LCD) technology. LCDs are normally configured as amplitude (intensity) modulators by sandwiching them between two linear polarization filters. However, when operated without the second polarizer, they retard (modulate) the phase of passing light differently depending on the rotation state of the liquid crystals in each pixel. An electric field across the cell gap of each pixel controls the amount of phase retardation. In principle such a standard display is sufficient to implement a dynamic lens. However there also exist dedicated, commercially available micro displays that have been optimized to a) maximize the amount of phase retardation (on the order of 2π and more) and to b) minimize the amount of polarization change. As such, the pixel values for this type of SLM correspond directly to our phase function p(.) as derived above. A larger phase retardation allows for lens surfaces with a steeper gradient, but comes at the cost of switching speed, as a thicker cell gap is required. If the phase change in the SLM does not affect polarization state ("phase-only"), this allows us to use the display in combination with other opto-electronic components further along the optical path, specifically a traditional amplitude SLM for dual modulation purposes. For further information on the topic we refer to [Robinson et al. 2005].

An example prototype embodiment used a reflective Liquid Crystal on Silicon (LCoS) chip distributed by [HOLOEYE]. This chip has a spatial resolution of 1920×1080 discrete pixels at a pixel pitch of 6.4 μm, and can be updated at up to 60 Hz. Access to a look-up-table allows for calibration of the modulator for different working wavelengths. The fill factor and reflectivity of the display are high compared to other technologies at 93% and 75% respectively. The phase retardation is calibrated to between 0 and 2π, equivalent to one wavelength of light. This is sufficient to generate freeform lenses with a long focal distance. For shorter focal distances, we require more strongly curved wavefronts, which creates larger values for p(.). We can address this issue by phase wrapping, i.e. just using the fractional part of p(.) to drive the SLM. This results in a pattern similar to a Fresnel lens.

We built two test beds. A first prototype contained a phase SLM without a second amplitude modulator, and is reconfigurable between two types of light source: a red 632.8 nm HeNe laser, and a white LED. This prototype allows us to test the freeform lensing approach in isolation, and to evaluate artifacts such as diffraction based on light source type. A second prototype is a full dual-modulation projector using a green 532 nm diode pumped solid state (DPSS) laser as a light source.

Figure 6A:
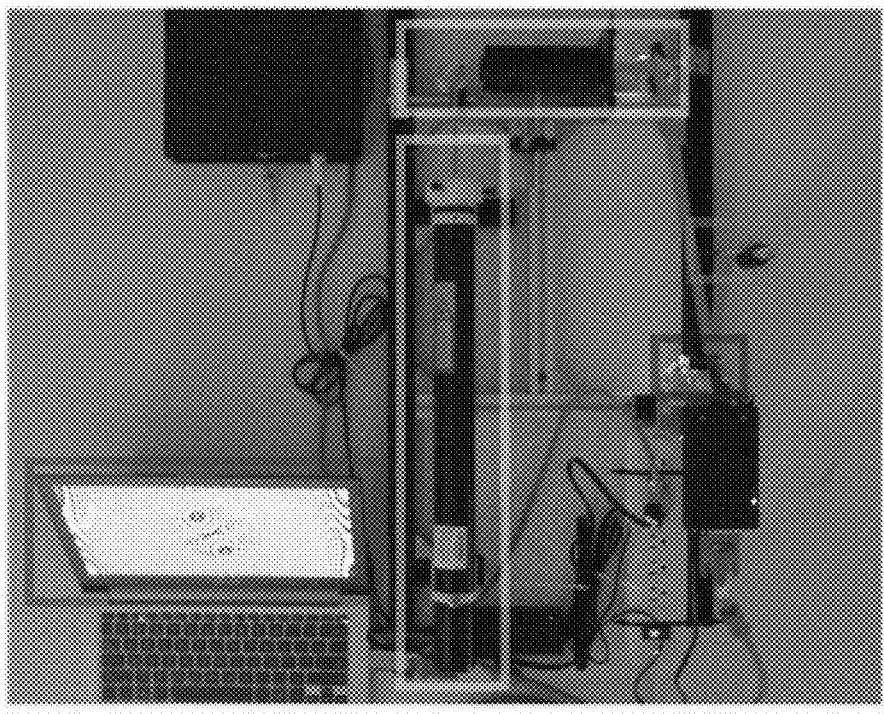
FIGS. 6A and 6B are photographs of prototype embodiments. Layout of a narrow-band, dynamic lensing test setup comprising a HeNe laser source, a beam expander, a linear polarization filter and folding mirrors, the phase-only SLM and a projection screen at 50 mm distance from the SLM. The SLM phase pattern used to generate the freeform lens (in this case the Siggraph logo) is also displayed on the notebook screen for visualization. Note the Fresnel-like phase wrapping used to achieve larger phase changes. Bottom: the white light configuration bypasses the laser module, and comprises a white LED, collimation optics and linear polarization filter, the phase-only SLM and a projection screen at 50 mm distance from the SLM. The SLM in this setup was calibrated for a center wavelength of 550 nm.
Figure 6B:
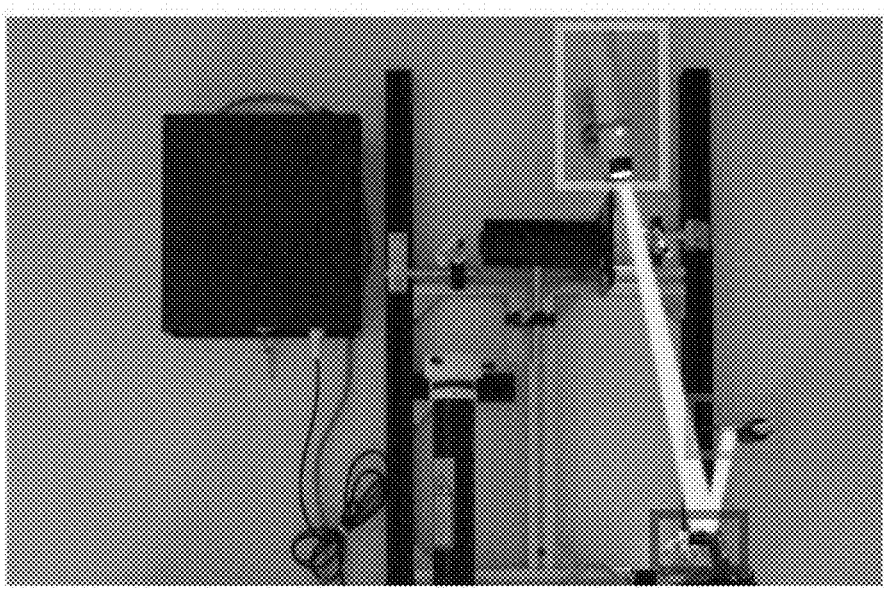

We first implemented a laser based system using a HeNe gas laser due to its good beam quality and low power which makes it safe in experiments (FIG. 6, top). This setup allows us to confirm and analyze diffraction patterns that we expect to observe.

A significant advantage of our method, which is based on refractive principles, over diffraction based projection approaches [Slinger et al. 2005] are reduced requirements of the light source. Where diffraction patterns utilized in 2D holographic projections systems ideally require spatially and temporally coherent light for image formation, our approach enables light redirection using partially collimated broadband light. This is advantageous as even recent laser-based projection systems require broadening of the to reduce artifacts such as screen speckle contrast as well as observer metamerism.

We demonstrate a prototype using a single, white broadband LED as a light source. In this example the LED had a short wavelength light emitting die (blue) and a conversion phosphor (green-yellow). See FIG. 6, bottom.

Figure 16:
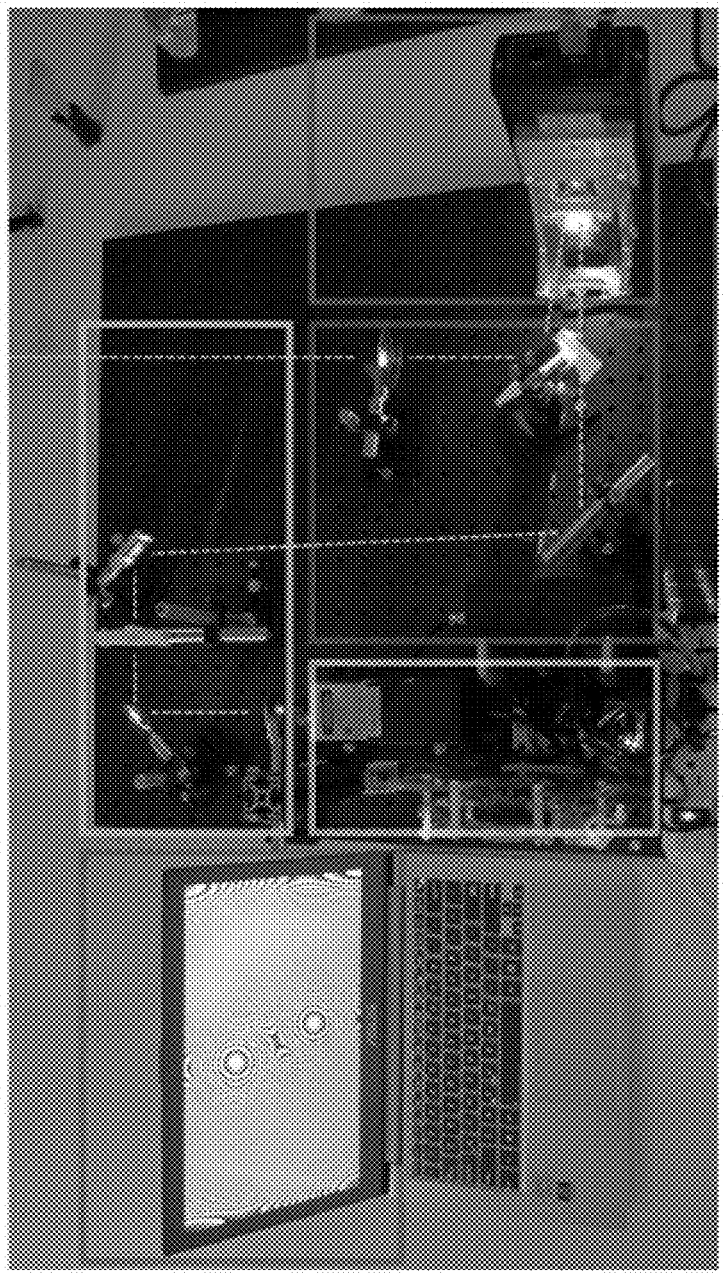
FIG. 16: Single modulation test setup for lasers comprising a light source (yellow box, 532 nm DPSS laser and laser controller), beam expansion and collimation optics (orange box), the reflective phase SLM (blue), various folding mirrors and a simple projection lens to relay the image from and intermediate image plane onto the projection screen (green). The phase pattern shown on the computer screen correlates linearly to the desired phase retardation in the optical path to form the image. It has been phase-wrapped at multiples of one wavelength and can be addressed directly onto the micro display SLM.
Figure 17:
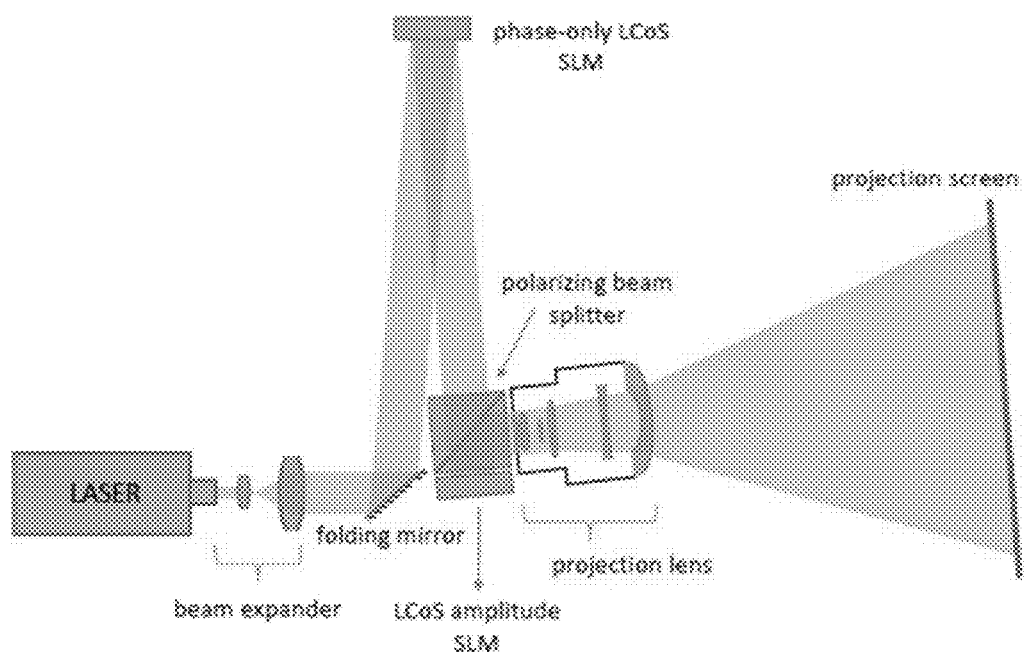
FIG. 17: Simplified system diagram of an example high brightness, HDR projector: light from an expanded and collimated laser beam is reflected off a phase-only modulator. The per-pixel amount of phase retardation resembles the height field of the dynamic lens calculated with our algorithm. The effective focal plane of this freeform lens is in-plane with an off-the-shelf, reflective projection head consisting of the polarizing beam splitter together with an LCoS microdisplay and a projection lens. Light from dark parts of the image can be used to create high luminance features, and simultaneously reduce the black level.

We also applied our new image formation approach on a laser based system using a 532 nm DPSS laser (FIG. 16). In contrast to the LED approach, the optical power of the laser light source (500 mW) is sufficient to relay and magnify the resulting light intensity profiles onto a larger projection screen for evaluation. FIG. 5.2 includes photos of a variety of artificial and natural test images projected through this first, single stage, phase-only part of our system.

Figure 8:
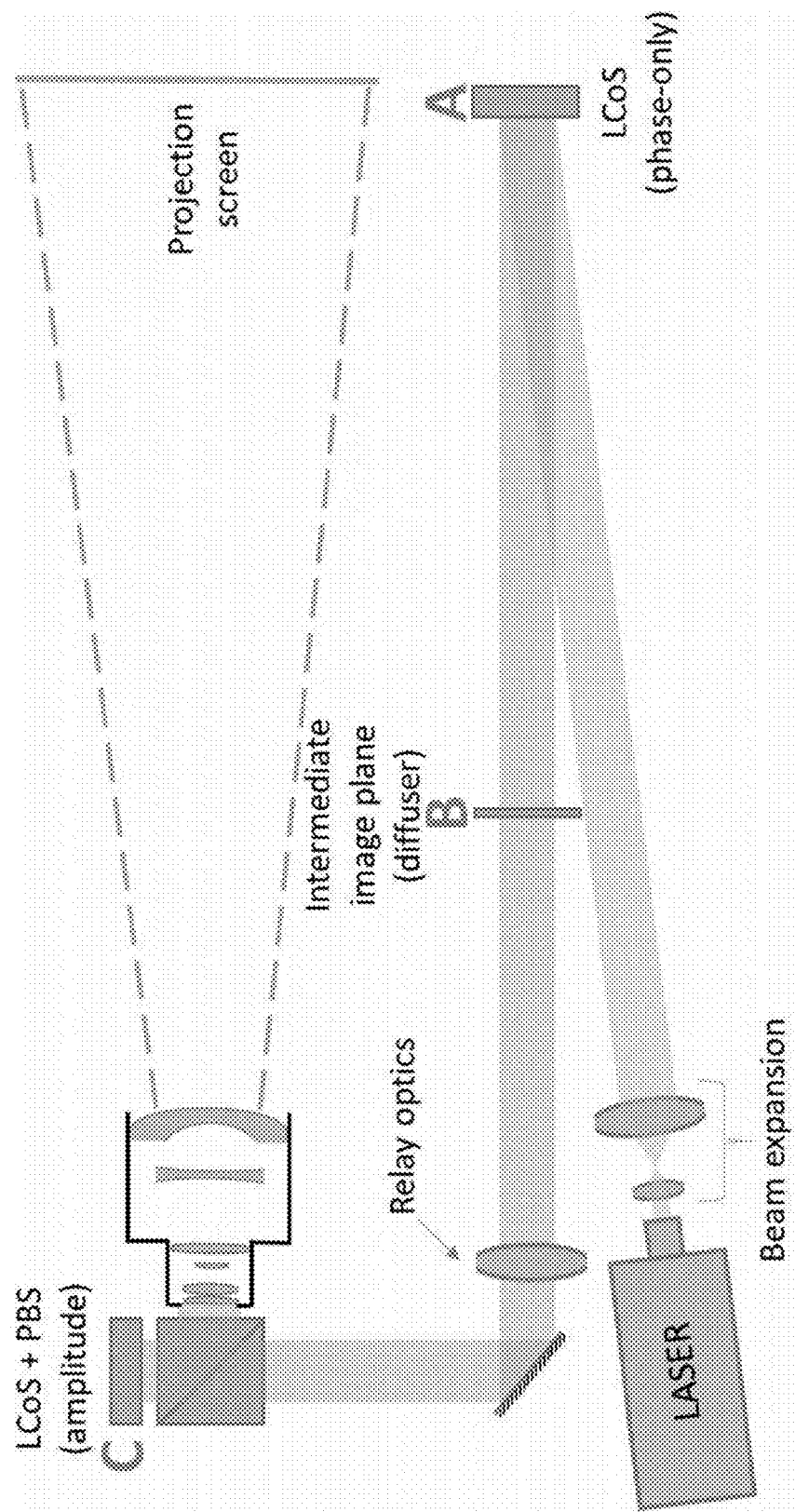
FIG. 8 is a system diagram of an example high brightness, HDR projector including an intermediary image plane in which light from the phase stage can be further shaped, for example by adding a light shaping diffuser: light from an expanded and collimated laser beam is reflected off a phase-only modulator. The per-pixel amount of phase retardation resembles the height field of the dynamic lens calculated with an algorithm as described herein. The effective focal plane of this free form lens is in-plane with an intermediary image plane, which is relayed onto an off-the-shelf, reflective projection head comprising the polarizing beam splitter together with an LCoS microdisplay and a projection lens via relay optics. Light from dark parts of the image can be used to create high luminance features, and simultaneously reduce the black level.

As anticipated and later confirmed by wavefront simulations (FIG. 18, second row) the use of single frequency lasers causes artifacts including noticeable screen speckle contrast and diffraction "fringes" due to interference (FIG. 18, third row). As previously mentioned these artifacts can be reduced below the noticeable visible threshold by using for example a set of lasers with different center wavelengths or broadband light source such as LED and lamps [2015]. A similar image "smoothing" effect can be achieved by spatially or temporally averaging the image using for example a diffuser or commercially available continuous deformable mirrors that introduces slight angular diversity in a pseudorandom fashion at high speeds. This is particularly useful when constrained to using a narrowband light source such as in our test setup. For ease of implementation we choose to use a thin film diffuser placed in the intermediate image plane following the phase SLM. Photos of the "cleaned-up" intensity profiles can be seen in (FIG. 8, fourth row).

We also demonstrate a first prototype of a high brightness, high dynamic range projection system, in which we form an image based on our dynamic lensing method and provide additional sharpness and contrast using a traditional LCoS-based amplitude modulating display.

Figure 7:
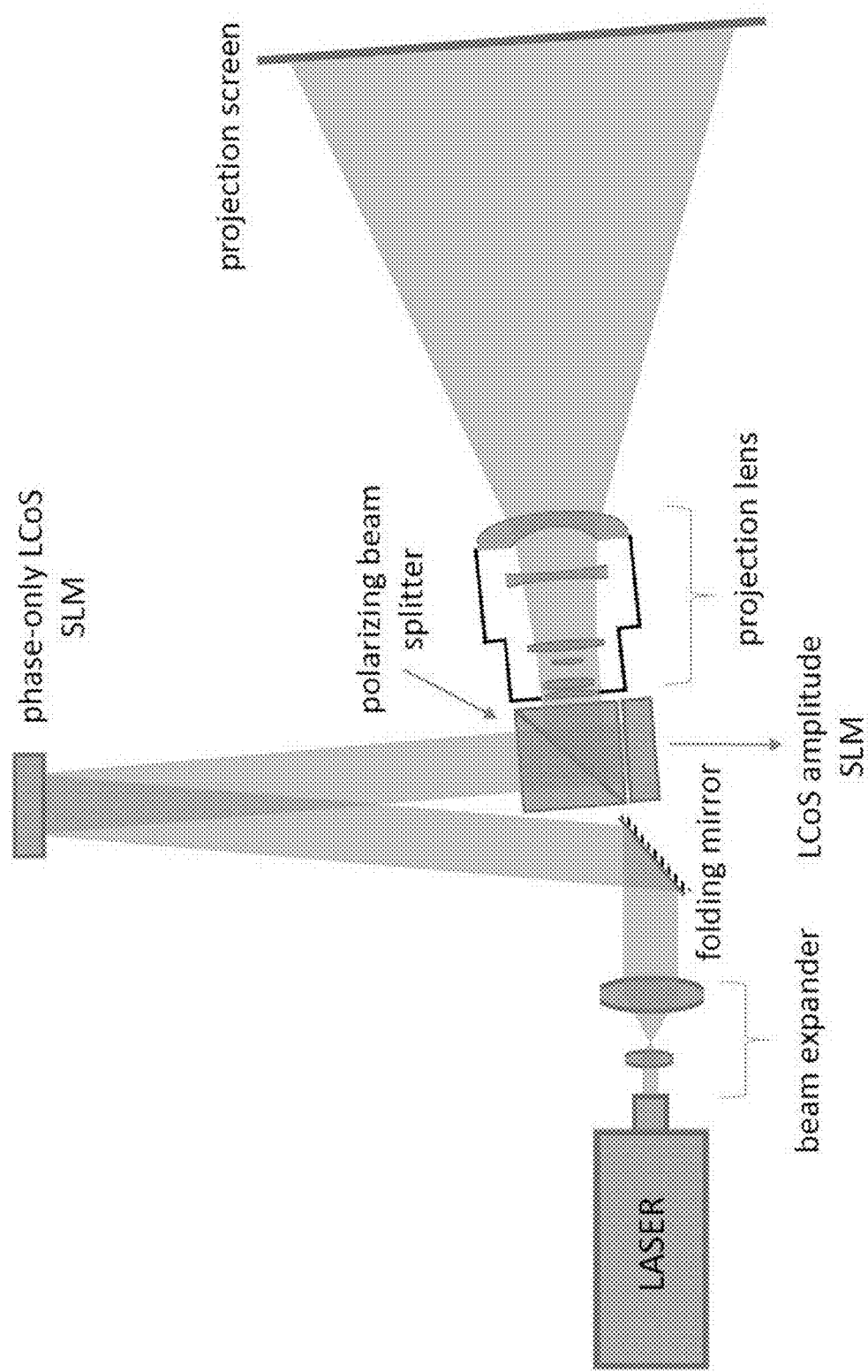
FIG. 7 is a system diagram of an example high brightness, HDR projector: light from an expanded and collimated laser beam is reflected off a phase-only modulator. The per-pixel amount of phase retardation resembles the height field of the dynamic lens calculated with an algorithm as described herein. The effective focal plane of this free form lens is in-plane with an off-the-shelf, reflective projection head consisting of the polarizing beam splitter together with an LCoS microdisplay and a projection lens. Light from dark parts of the image can be used to create high luminance features, and simultaneously reduce the black level.

At a high level, the light path of a traditional projection system includes a high intensity light source and some form of beam shaping, for example beam expansion, collimation and homogenization, color separation and recombining optics. At the heart of the projector, a small SLM attenuates the amplitude of light per pixel. Our prototype retained this architecture but replace the uniform illumination module with both a laser illumination and a phase SLM (FIG. 7). Our lensing system is inserted between the light source and the existing SLM, and forms an approximate light distribution on an intermediate image plane coinciding with the SLM plane.

The freeform lensing approach redistributes light from dark image regions to bright ones, thus increasing both contrast and local peak brightness, which is known to have a significant impact on visual realism [Rempel et al. 2011].

We initially use a crude forward image formation model for the phase SLM to predict the illumination profile present at the second, amplitude-only modulator. Given the phase function from the freeform lensing algorithm, the light distribution on the image plane is predicted using the simple model from Equations 2 and 4. The amount of smoothness introduced at the diffuser at the intermediate image plane can be approximated using a blur kernel and the modulation pattern required for the amplitude modulator is then obtained to introduce any missing spatial information as well as additional contrast where needed. We note that careful calibration and characterization of the entire optical system is required to optimally drive the SLMs. No significant efforts beyond careful spatial registration of the two images (illumination profile caused by phase retardation and amplitude modulation on the SLM) and calibration to linear increments in light intensity were performed for this work.

Similar to the case of flat panel HDR displays [Seetzen et al. 2004], we can use a forward image formation model for the phase SLM to predict the "backlight" illumination for second, amplitude-only modulator. The modulation pattern for the amplitude modulator may be obtained by dividing the HDR target image by the "backlight" pattern.

FIG. 18 shows a selection of simulated and experimental results for our method. The first row of FIG. 18 ("Phase Patterns") shows the phase patterns computed by Algorithm 4.1 as applied to the phase modulator with black corresponding to no phase retardation and white corresponding to a retardation of $2\pi$. These patterns illustrate how phase patterns with maximum phase retardation larger than $2\pi$ can be wrapped to the maximum phase retardation of the modulator, resulting in a pattern similar to a Fresnel lens.

The second row of FIG. 18 ('Simulation') shows simulations of the phase pattern using the Huygens-Fresnel principle. Unlike geometric optics simulations such as path tracing, these simulations are able to capture many of the diffraction artifacts. The third row ("Direct") shows photos of our prototype using only phase modulation that exhibit diffraction artifacts as well as noise due to laser speckle. These artifacts can be almost entirely removed by introducing the diffuser in the fourth row of FIG. 18 ("Diffused"); the photos for this row used identical camera settings to the "Direct" row.

Phase Pattern: the phase pattern as computed by Algorithm 1.

Simulation: Huygens-Fresnel simulation of predicted image.

Direct: photograph of actual image without diffuser showing diffraction artifacts.

Diffuser: by adding the a thin-film diffuser, artifacts such as diffraction fringes nearly completely mitigated.

Standard: photo of standard, amplitude modulation only projection using a single amplitude modulator shows elevated black levels and low contrast.

Proposed (HDR): Using our lensing approach redistributes light from dark regions to bright regions, resulting in improved black levels and increased highlight intensity. The last two rows appear slightly distorted due to an off-angle position of the camera which became necessary because of a short throw projection and close screen as well as baffles to block ambient light effectively to capture the black level of the system.

In the fifth row of FIG. 18 ("Standard"), we show photographs of our dual-modulation projector operating using only the amplitude modulator. This is achieved by providing a constant valued phase function to disable light redistribution. The results are typical of single stage projectors, leaked light pollutes black levels and overall contrast is low due to an inefficient use of available power limiting highlight intensity.

Finally in the last row of FIG. 18 ("Proposed (HDR)"), we show photos of our proposed phase+amplitude dual modulation approach. These photos were captured with identical camera settings to the "Standard" results (fifth row), and show that our method not only recovers better black levels but also, as expected, increases the brightness of highlights by redistributing light from dark regions of the image to lighter regions. This makes better use of available power, enabling high-dynamic range projection with drastically reduced power consumption when compared to dual amplitude modulation approaches.

FIG. 5A (left) shows the Lena image reproduced on the white light version of this setup. As expected, the broadband illumination averages out most of the diffraction artifacts, resulting only in a relatively small spatial blur, very similar to the backlight blur in the original dual modulation work by Seetzen et al. [2004]. This blur can be calibrated easily and can be compensated for in a dual modulation setup.

Figure 9:
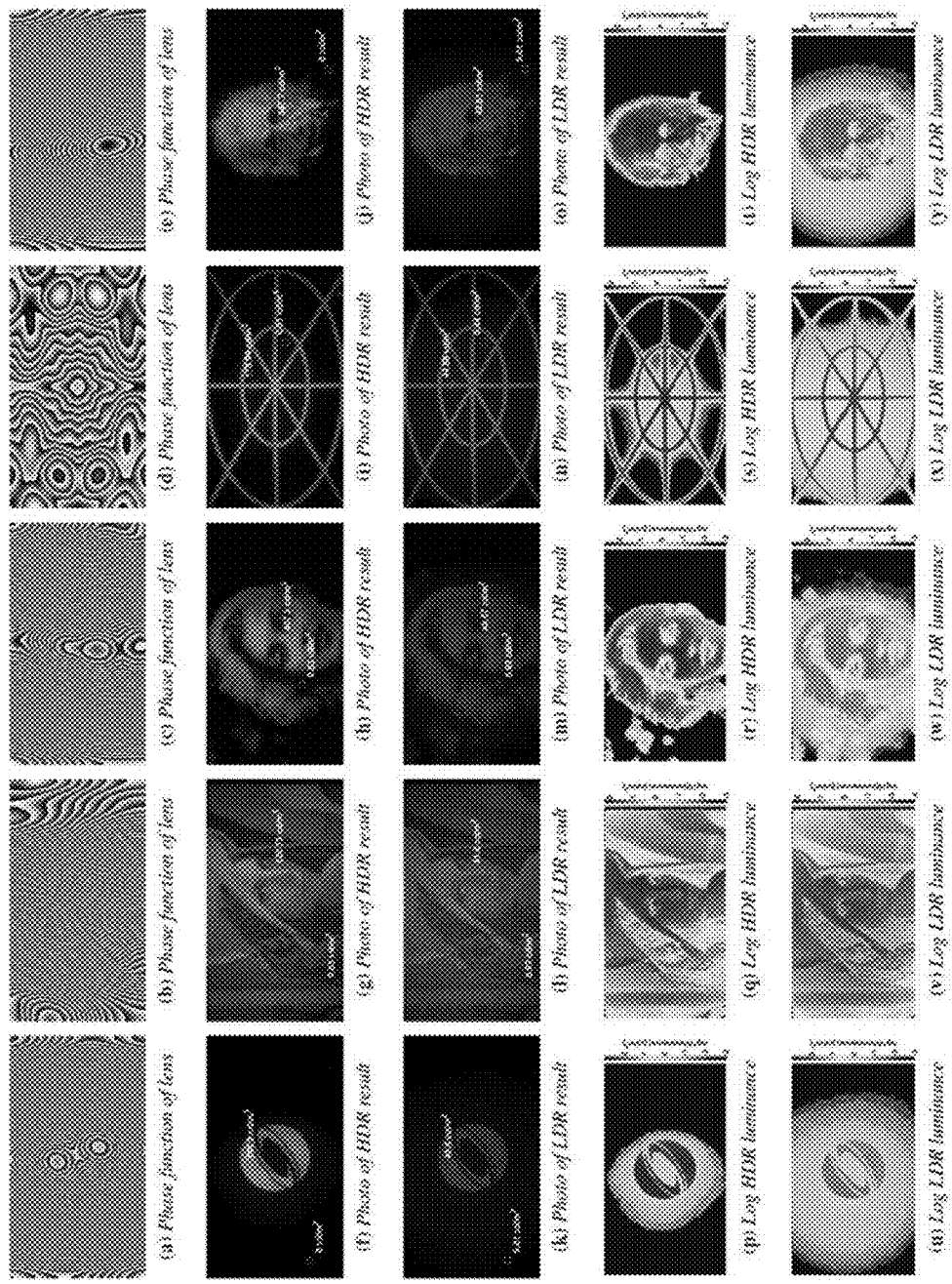
FIG. 9 shows the comparison of simulated and captured results from top to bottom by row. Phase Pattern: the phase pattern as computed by Algorithm 1. Simulation: Huygens-Fresnel simulation of predicted image. Direct: photograph of actual image without diffuser showing diffraction artifacts. Diffuser: by adding the a thin-film diffuser, artifacts such as diffraction fringes nearly completely mitigated. Standard: photo of standard, amplitude modulation only projection using a single amplitude modulator shows elevated black levels and low contrast. Proposed (HDR): Using our lensing approach redistributes light from dark regions to bright regions, resulting in improved black levels and increased highlight intensity. The last two rows appear slightly distorted due to an off-angle position of the camera which became necessary because of a short throw projection and close screen as well as baffles to block ambient light effectively to capture the black level of the system.

Results from our dual modulation setup are shown in FIGS. 9 and 10. FIG. 9 shows just the effect of the freeform lensing approach, with the amplitude SLM set to a constant value. As in the HeNe laser setup, we can identify a range of diffraction artifacts, although they are less pronounced here due to the larger focal distance, and the reduced usage of phase wrapping. FIG. 10 shows a result of the actual dual modulation approach. The second modulator stage has increase contrast and added significant detail, but cannot get rid of some of the high-frequency artifacts.

The following references provide background information and are hereby incorporated herein by reference.

BERRY, M. 2006. Oriental magic mirrors and the Laplacian image. European journal of physics 27, 1, 109.

BIMBER, O., AND IWAI, D. 2008. Superimposing dynamic range. ACM Trans. Graph. 27, 5, 150.

BLACKHAM, G., AND NEALE, A., 1998. Image display apparatus, March 18. EP Patent App. EP19,970,306,624.

BUCKLEY, E. 2008. 70.2: Invited paper: holographic laser projection technology. In Proc. SID, vol. 39, 1074-1079.

DAMBERG, G., SEETZEN, H., WARD, G., HEIDRICH, W., AND WHITEHEAD, L. 2007. 3.2: High dynamic range projection systems. In Proc. SID, vol. 38, Wiley Online Library, 4-7.

DAMBERG, G., SEETZEN, H., WARD, G., KANG, M., LONGHURST, P., HEIDRICH, W., AND WHITEHEAD, L. 2007. High dynamic range projector. Siggraph Emerging Technologies.

FINCKH, M., DAMMERTZ, H., AND LENSCH, H. P. 2010. Geometry construction from caustic images. In Proc. ECCV, 464-477.

HAUGEN, P. R., BARTELT, H., AND CASE, S. K. 1983. Image formation by multifacet holograms. Applied optics 22, 18, 2822-2829.

HOLOEYE. Photonics corporation. URL http://www.holoeye.com.

HOSKINSON, R., STOEBER, B., HEIDRICH, W., AND FELS, S. 2010. Light reallocation for high contrast projection using an analog micromirror array. ACM Transactions on Graphics (TOG) 29, 6, 165.

HOSKINSON, R., HAMPL, S., AND STOEBER, B. 2012. Arrays of large-area, tip/tilt micromirrors for use in a high-contrast projector. Sensors and Actuators A: Physical 173, 1, 172-179.

HULLIN, M. B., IHRKE, I., HEIDRICH, W., WEYRICH, T., DAMBERG, G., AND FUCHS, M. 2013. State of the art in computational fabrication and display of material appearance. In Eurographies Annual Conference (STAR).

KISER, T., EIGENSATZ, M., NGUYEN, M. M., BOMPAS, P., AND PAULY, M. 2013. Architectural caustics controlling light with geometry. In Advances in Architectural Geometry 2012. Springer, 91-106.

[Kusakabe et al. 2009] Kusakabe, Y., Kanazawa, M., Nojiri, Y., Furuya, M., and Yoshimura, M. 2009. A high-dynamic-range and high-resolution projector with dual modulation. vol. 7241, 72410Q-72410Q-11.

LESEM, L., HIRSCH, P., AND JORDAN, J. 1969. The kinoform: a new wavefront reconstruction device. IBM Journal of Research and Development 13, 2, 150-155.

MENN, S., CORNELISSEN, S. A., AND BIERDEN, P. A. 2007. Advances in mems deformable mirror technology for laser beam shaping. In Photonic Devices+Applications, International Society for Optics and Photonics, 66630M-66630M.

MINANO, J. C., BENITEZ, P., AND SANTAMARIA, A. 2009. Freeform optics for illumination. Optical Review 16, 2, 99-102.

[Ng et al. 1999] Ng, M. K., Chan, R. H., and Tang, W.-C. 1999. A fast algorithm for deblurring models with neumann boundary conditions. *SIAM Journal on Scientific Computing* 21, 3, 851-866.

[NVIDIA] NVIDIA, C. Programming guide, cusparse, cublas, and cufft library user guides. {Online}.

PAPAS, M., JAROSZ, W., JAKOB, W., RUSINKIEWICZ, S., MATUSIK, W., AND WEYRICH, T. 2011. Goal-based caustics. Computer Graphics Forum 30, 2, 503-511.

PAPAS, M., HOUIT, T., NOWROUZEZAHRAI, D., GROSS, M., AND JAROSZ, W. 2012. The magic lens: refractive steganography. ACM Transactions on Graphics (TOG) 31, 6, 186.

[Parikh and Boyd 2013] Parikh, N., and Boyd, S. 2013. Proximal algorithms. *Foundations and Trends in Optimization* 1, 3, 123-231.

PAULY, M., AND KISER, T. 2012. Caustic art. Tech. rep.

REMPEL, A., HEIDRICH, W., LI, H., AND MANTIUK, R. 2009. Video viewing preferences for hdr displays under varying ambient illumination. Proc. APGV, 45-52.

REMPEL, A., HEIDRICH, W., AND MANTIUK, R. 2011. The role of contrast in the perceived depth of monocular imagery. Proc. APGV, 115.

ROBINSON, M. D., SHARP, G., AND CHEN, J. 2005. Polarization engineering for LCD projection, vol. 4. John Wiley & Sons.

SCHWARTZBURG, Y., TESTUZ, R., TAGLIASACCHI, A., AND PAULY, M. 2014. High-contrast computational caustic design. ACM Trans. Graph. (Proc. Siggraph). (in print).

SEETZEN, H., HEIDRICH, W., STUERZLINGER, W., WARD, G., WHITEHEAD, L., TRENTACOSTE, M., GHOSH, AND VOROZCOVS, A. 2004. High dynamic range display systems. ACM Trans. Graph. (Proc. SIGGRAPH) (August), 760-768.

SEETZEN, H. 2009. High dynamic range display and projection systems. PhD thesis, University of British Columbia.

[Silvester and Mihajlović 2004] Silvester, D. J., and Mihajlović, M. D. 2004. A black-box multigrid preconditioner for the biharmonic equation. *BIT Numerical Mathematics* 44, 1, 151-163.

SLINGER, C., CAMERON, C., AND STANLEY, M. 2005. Computer-generated holography as a generic display technology. IEEE Computer 38, 8, 46-53.

[Tang and Christov 2006] Tang, X. H., and Christov, C. I. 2006. An operator splitting scheme for biharmonic equation with accelerated convergence. In *Proceedings of the 5th International Conference on Large-Scale Scientific Computing*, Springer-Verlag, Berlin, Heidelberg, LSSC'05, 387-394.

YUE, Y., IWASAKI, K., CHEN, B.-Y., DOBASHI, Y., AND NISHITA, T. 2012. Pixel art with refracted light by rearrangeable sticks. Computer Graphics Forum 31, 2pt3, 575-582.

YUE, Y., IWASAKI, K., CHEN, B.-Y., DOBASHI, Y., AND NISHITA, T. 2014. Poisson-based continuous surface generation for goal-based caustics. ACM Trans. Graph. (in print).

[Zhao 2004] Zhao, J. 2004. Convergence of v-cycle and f-cycle multigrid methods for the biharmonic problem using the morley element. *Electronic Transactions on Numerical Analysis* 17, 112-132.

It can be appreciated that some embodiments provide one or more of the following:

- A new, algorithm for freeform lens optimization ("goal-based caustics") that is dramatically simpler than some prior art algorithms. The algorithm may be applied to controlling the projection of light in real time or near real time.
- Some embodiments operate directly in phase space and therefore can be implemented as iterative methods that can not only generate modulation patterns for a phase modulator, but also for conventional refractive lenses without additional steps such as Poisson integration.
- A new dual-modulation projector design that combines one phase and one amplitude modulator for image generation and is capable of working white (incoherent) light. To our knowledge,
- Methods and apparatus as described herein may also be applied for generating static light fields useful, for example, for architectural lighting and/or vehicle lighting.
- direct optimization for the modulated phase of the light, no need to trade off between data term and integrability of the surface
- made possible by finding a parameterization of the problem that allows us to express the optimization in the modulator/lens plane rather than the image plane.
- our derivation relies on small angle image formation (paraxial approximation), which is well established in the optics community.

Interpretation of Terms

Unless the context clearly requires otherwise, throughout the description and the

- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, PDAs, color-grading tools, video projectors, audio-visual receivers, displays (such as televisions), digital cinema projectors, media players, and other devices suitable for the purposes described herein. Those skilled in the relevant art will appreciate that aspects of the system can be practised with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics (e.g., video projectors, audio-visual receivers, displays, such as televisions, and the like), set-top boxes, network PCs, mini-computers, mainframe computers, and the like.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above. In some embodiments image data is processed by a processor executing software instructions to yield control signals for a phase modulator. The software may execute in real time in some embodiments (other embodiments are also possible).

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The following are non-limiting enumerated example embodiments of the invention:

1. A method for controlling a phase modulator to display a target light pattern defined by image data, the method comprising:

initializing a warped image based on the image data, the warped image warped from the target light pattern by distortions corresponding to a phase function $p(x)$ representing a phase shift applied by the phase modulator for regions in the lens plane;

refining the phase function and the warped image by performing a plurality of iterations wherein each of the plurality of iterations includes:

a step of updating the phase function by performing an optimization which yields an updated phase function wherein the updated phase function reduces a difference measure between the warped image and the inverse of a magnification provided by the phase function at points in the warped image; and a step of warping the target light pattern onto the lens plane using a distortion $u(x)$ produced by the updated phase function $p(x)$ to yield an updated warped image.

2. A method according to enumerated example embodiment 1 wherein the difference measure comprises a sum of squares of differences between pixels of the warped image and inverses of the magnification at the points in the warped image.

3. A method according to enumerated example embodiment 1 or 2 wherein the updating the phase function comprises computing differences between pixels of the warped image and corresponding values for $1-f\cdot\nabla^2 p(x)$.

4. A method according to enumerated example embodiment 1 or 2 wherein the updating the phase function comprises computing differences between pixels of the warped image and corresponding values for $1/(1+f\cdot\nabla^2 p(x))$.

5. A method according to any one of enumerated example embodiments 1 to 3 wherein the step of updating the phase function comprises solving a linear least squares problem.

6. A method according to enumerated example embodiment 4 wherein the least squares problem comprises a system matrix comprising a discrete Laplace operator.

7. A method according to enumerated example embodiment 1 wherein the step of updating the phase function comprises solving:

$$\hat{p}(x) = \operatorname{argmin}_{p(x)} \int_x (i_p(x) - 1 + f\cdot\nabla^2 p(x))^2 dx$$

8. A method according to any one of enumerated example embodiments 4 to 6 wherein performing the optimization comprises applying an algorithm selected from the group consisting of: Conjugate Gradient (CG), BICGSTAB and Quasi Minimal Residual (QMR).

9. A method according to any one of enumerated example embodiments 1 to 7 wherein the step of warping the target intensity in the image plane backwards onto the lens plane comprises performing a texture mapping operation.

10. A method according to enumerated example embodiment 8 wherein the texture mapping operation is implemented on a graphics processor unit.

11. A method according to enumerated example embodiment 8 or 9 wherein the step of warping the target intensity in the image plane backwards onto the lens plane comprises computing:

$$i_p(x)=i(x+f \cdot \nabla p(x))$$

12. A method according to any one of enumerated example embodiments 1 to 11 comprising modelling blur in an image at the image plane and generating control values for an amplitude modulator that tend to compensate at least in part for the blur.

13. A method according to any one of enumerated example embodiments 1 to 12 comprising displaying the target light pattern by controlling the phase modulator according to the phase function and illuminating the phase modulator with light.

14. A method according to enumerated example embodiment 13 wherein the light is broadband light.

15. A method according to enumerated example embodiment 14 wherein the broadband light is white light.

16. A method according to enumerated example embodiment 13 wherein the light is monochromatic.

17. A method according to enumerated example embodiment 13 or 16 wherein the light is laser light.

18. A method according to any one of enumerated example embodiments 13 to 17 wherein the light is collimated.

19. A method according to enumerated example embodiment 18 wherein the light is incident on the phase modulator in a direction normal to the lens plane.

20. A method according to any one of enumerated example embodiments 1 to 19 wherein the light pattern comprises one or more bright spots of light.

21. A method according to enumerated example embodiment 20 comprising controlling the phase function applied to the phase modulator to cause the one or more bright spots of light to move.

22. A method according to enumerated example embodiment 20 or 21 wherein the one or more bright spots of light have intensities exceeding a maximum uniform illumination intensity at the image plane.

23. A method according to any one of enumerated example embodiments 1 to 22 wherein a resolution of the phase modulator is at least 1 Megapixels.

24. A method according to enumerated example embodiment 23 wherein the phase modulator comprises at least 5 Megapixels.

25. A method according to any one of enumerated example embodiments 1 to 24 wherein the light pattern occupies an image area in the image plane and, from any point on the phase modulator, a light ray directed from the point to any point on a boundary of the image area forms an angle $\theta$ to a normal of the phase modulator wherein $|\theta| \leq 12°$.

26. A method according to any one of enumerated example embodiments 1 to 24 wherein a numerical aperture for points in the lens plane is such that the paraxial approximation holds to within 1%.

27. A method according to any one of enumerated example embodiments 1 to 26 wherein initializing the warped image comprises setting the warped image to be the same as the target light pattern.

28. A method according to any one of enumerated example embodiments 1 to 27 wherein the phase modulator comprises a liquid crystal phase modulator.

29. A method according to enumerated example embodiment 28 wherein the phase modulator comprises a LCoS device.

30. A method according to any one of enumerated example embodiments 1 to 27 wherein the phase modulator comprises a variable mirror.

31. A method according to any one of enumerated example embodiments 1 to 30 wherein the image data comprises video data having a frame rate of at least 20 frames per second.

32. A method according to enumerated example embodiment 31 wherein the video data provides a different target light pattern for each frame and the method comprises calculating a different phase function for each frame.

33. A method according to enumerated example embodiment 32 comprising calculating the different phase functions in real time.

34. A method according to any one of enumerated example embodiments 1 to 33 wherein refining the phase function and the warped image is performed in 10 or fewer of the iterations.

35. A method according to any one of enumerated example embodiments 1 to 34 wherein refining the phase function and the warped image is performed in a fixed number of the iterations.

36. A method according to any one of enumerated example embodiments 1 to 35 comprising executing one or more steps of refining the phase function and the warped image in parallel in one or more graphics processor units.

37. A method according to any one of enumerated example embodiments 1 to 35 comprising performing at least some steps of refining the phase function and the warped image in a frequency domain.

38. A method according to enumerated example embodiment 37 comprising generating an optimization function; performing a Fourier transform on the warped image, generating the phase function in the frequency domain using the Fourier transform of the warped image and performing an inverse Fourier transformation on the phase function.

39. A method according to enumerated example embodiment 38 comprising performing the Fourier transform in hardware configured to perform the Fourier transform.

40. A method according to any one of enumerated example embodiments 37 to 39 comprising, before performing the steps in the frequency domain, extending the image data to have periodic boundary conditions.

41. A method according to enumerated example embodiment 40 wherein extending the image data comprises making a mirror image of the image data across each boundary of the image data.

42. A method according to any one of enumerated example embodiments 1 to 41 comprising generating control signals for a spatial light modulator to correct intensities of light modulated by the phase modulator.

43. A method according to any one of enumerated example embodiments 1 to 42 comprising performing one or more of the iterations at a first spatial resolution and upsampling the updated phase function yielded by the one or more of the iterations.

44. A method according to enumerated example embodiment 43 comprising, subsequent to upsampling the updated phase function, performing one or more additional ones of the iterations at a second resolution higher than the first resolution.
45. A method according to any one of enumerated example embodiments 1 to 44 wherein the image data comprises video data, the target light pattern is defined for one of the frames of the image data and different target light patterns are defined in the image data for other frames of the image data.
46. Apparatus for controlling a phase modulator to display a target light pattern defined by image data, the apparatus comprising a data processor in communication with the phase modulator, the data processor configured to:
receive the image data as input;
initialize a warped image based on the image data, the warped image warped from the target light pattern by distortions corresponding to a phase function p(x) representing a phase shift applied by the phase modulator for regions in the lens plane;
refine the phase function and the warped image by performing a plurality of iterations wherein each of the plurality of iterations includes:
a step of updating the phase function by performing an optimization which yields an updated phase function wherein the updated phase function reduces a difference measure between the warped image and the inverse of a magnification provided by the phase function at points in the warped image; and
a step of warping the target light pattern onto the lens plane using a distortion u(x) produced by the updated phase function p(x) to yield an updated warped image; and
generate control signals for the phase modulator based on the refined phase function.
47. Apparatus according to enumerated example embodiment 46 wherein the difference measure comprises a sum of squares of differences between pixels of the warped image and inverses of the magnification at the points in the warped image.
48. Apparatus according to enumerated example embodiment 46 or 47 wherein the step of updating the phase function comprises computing, by the data processor, differences between pixels of the warped image and corresponding values for $-1+f\cdot\nabla^2 p(x)$.
49. Apparatus according to enumerated example embodiment 46 or 47 wherein the step of updating the phase function comprises computing, by the data processor, differences between pixels of the warped image and corresponding values for $1/(1+f\cdot\nabla^2 p(x))$.
50. Apparatus according to any one of enumerated example embodiments 46 to 48 wherein the step of updating the phase function comprises solving, by the data processor, a linear least squares problem.
51. Apparatus according to enumerated example embodiment 49 wherein the least squares problem comprises a system matrix comprising a discrete Laplace operator.
52. Apparatus according to enumerated example embodiment 46 wherein the step of updating the phase function comprises solving, by the data processor:

$$\tilde{p}(x)=\mathrm{argmin}_{p(x)}\int_x (i_p(x)-1+f\cdot\nabla^2 p(x))^2 dx$$

53. Apparatus according to enumerated example embodiments 49 to 51 wherein performing the optimization comprises applying, by the data processor, an algorithm selected from the group consisting of: Conjugate Gradient (CG), BICGSTAB and Quasi Minimal Residual (QMR).
54. Apparatus according to any one of enumerated example embodiments 46 to 52 wherein the step of warping the target intensity in the image plane backwards onto the lens plane comprises performing a texture mapping operation.
55. Apparatus according to enumerated example embodiment 53 comprising a graphics processor unit and wherein the texture mapping operation is implemented on the graphics processor unit.
56. Apparatus according to enumerated example embodiment 53 or 54 wherein the step of warping the target intensity in the image plane backwards onto the lens plane comprises computing, by the data processor:

$$i_p(x)=i(x+f\cdot\nabla p(x))$$

57. Apparatus according to any one of enumerated example embodiments 46 to 56 wherein the data processor is configured to model blur in an image at the image plane and generate control values for an amplitude modulator that tend to compensate at least in part for the blur.
58. Apparatus according to any one of enumerated example embodiments 46 to 57 comprising the phase modulator and a light source for projecting light on the phase modulator, wherein the data processor is configured to generate the target light pattern by controlling the phase modulator according to the phase function and controlling the light source to illuminate the phase modulator with light.
59. Apparatus according to enumerated example embodiment 58 wherein the light is broadband light.
60. Apparatus according to enumerated example embodiment 59 wherein the broadband light is white light.
61. Apparatus according to enumerated example embodiment 58 wherein the light is monochromatic.
62. Apparatus according to enumerated example embodiment 59 or 61 wherein the light is laser light.
63. Apparatus according to any one of enumerated example embodiments 58 to 62 wherein the light is collimated.
64. Apparatus according to enumerated example embodiment 63 wherein the light source is configured to project light incident on the phase modulator in a direction normal to the lens plane.
65. Apparatus according to any one of enumerated example embodiments 58 to 64 wherein a resolution of the phase modulator is at least 1 Megapixels.
66. Apparatus according to enumerated example embodiment 65 wherein the resolution of the phase modulator is at least 5 Megapixels.
67. Apparatus according to any one of enumerated example embodiments 58 to 66 wherein the target light pattern occupies an image area in the image plane and, from any point on the phase modulator, a light ray directed from the point to any point on a boundary of the image area forms an angle θ to a normal of the phase modulator wherein |θ|≤12°.
68. Apparatus according to any one of enumerated example embodiments 58 to 67 wherein the phase modulator comprises a liquid crystal phase modulator.
69. Apparatus according to enumerated example embodiment 68 wherein the phase modulator comprises a LCoS device.
70. Apparatus according to enumerated example embodiments 58 to 67 wherein the phase modulator comprises a variable mirror.
71. Apparatus according to any one of enumerated example embodiments 46 to 70 wherein the target light pattern comprises one or more bright spots of light.

72. Apparatus according to enumerated example embodiment 71 wherein the data processor is configured to control the phase function applied to the phase modulator to cause the one or more bright spots of light to move.
73. Apparatus according to enumerated example embodiment 71 or 72 wherein the one or more bright spots of light have intensities exceeding a maximum uniform illumination intensity at the image plane.
74. Apparatus according to any one of enumerated example embodiments 46 to 73 wherein a numerical aperture for points in the lens plane is such that the paraxial approximation holds to within 1%.
75. Apparatus according to any one of enumerated example embodiments 46 to 74 wherein the data processor being configured to initialize the warped image comprises the data processor being configured to set the warped image to be the same as the target light pattern.
76. Apparatus according to any one of enumerated example embodiments 46 to 75 wherein the image data comprises video data having a frame rate of at least 20 frames per second.
77. Apparatus according to enumerated example embodiment 76 wherein the video data provides a different target light pattern for each frame and the data processor is configured to calculate a different phase function for each frame.
78. Apparatus according to enumerated example embodiment 77 wherein the data processor is configured to calculate the different phase functions in real time.
79. Apparatus according to any one of enumerated example embodiments 46 to 78 wherein the data processor is configured to refine the phase function and the warped image in 10 or fewer iterations.
80. Apparatus according to any one of enumerated example embodiments 46 to 78 wherein the data processor is configured to refine the phase function and the warped image in a fixed number of the iterations.
81. Apparatus according to any one of enumerated example embodiments 46 to 78 comprising one or more graphics processor units wherein the data processor is configured to execute one or more steps of refining the phase function and the warped image in parallel in the one or more graphics processor units.
82. Apparatus according to any one of enumerated example embodiments 46 to 80 wherein the data processor is configured to perform at least some steps of refining the phase function and the warped image in a frequency domain.
83. Apparatus according to enumerated example embodiment 82 wherein the data processor is configured to: perform a Fourier transform on the warped image, generate the phase function in the frequency domain using the Fourier transform of the warped image and perform an inverse Fourier transformation on the phase function.
84. Apparatus according to enumerated example embodiment 83 comprising a hardware Fourier transform device wherein the data processor is configured to control the Fourier transform device to perform the Fourier transform.
85. Apparatus according to any one of enumerated example embodiments 46 to 84 comprising a spatial light modulator wherein the data processor is configured to apply control signals to the spatial light modulator to correct intensities of light modulated by the phase modulator.
86. Apparatus according to any one of enumerated example embodiments 82 to 84 wherein the data processor is configured to extend the image data to have periodic boundary conditions before performing the steps in the frequency domain.
87. Apparatus according to enumerated example embodiment 86 wherein extending the image data comprises making a mirror image of the image data across each boundary of the image data.
88. Apparatus according any one of enumerated example embodiments 46 to 87 comprising generating control signals for a spatial light modulator to correct intensities of light modulated by the phase modulator.
89. Apparatus according to any one of enumerated example embodiments 46 to 88 wherein the data processor is configured to perform one or more of the iterations at a first spatial resolution and upsample the updated phase function yielded by the one or more of the iterations.
90. Apparatus according to enumerated example embodiment 89 wherein the data processor is configured to perform one or more additional ones of the iterations at a second resolution higher than the first resolution, subsequent to upsampling the updated phase function.
91. Apparatus according any one of enumerated example embodiments 46 to 90 wherein the image data comprises video data, the target light pattern is defined for one of the frames of the image data and different target light patterns are defined in the image data for other frames of the image data.
92. A method for generating control values for a phase modulator from image data defining a target light pattern, the method comprising:
establishing a mapping between points in the light pattern and corresponding points on the phase modulator;
using the mapping, deriving a phase function, p, that includes the control values by mapping the target light pattern into a coordinate space of the phase modulator; and
processing the mapped target light pattern in the coordinate space of the phase modulator.
93. The method according to enumerated example embodiment 92 wherein processing the mapped target light pattern comprises optimizing a trial phase function based on comparisons of intensities in the mapped target light pattern at the points on the phase modulator to corresponding optical properties of the phase function in neighborhoods of the points.
94. The method according to enumerated example embodiment 93 wherein the corresponding optical properties comprise magnifications.
95. The method according to any one of enumerated example embodiments 93 and 94 comprising determining the optical properties based on a Laplacian of the phase function at the corresponding points.
96. The method according to enumerated example embodiment 95 comprising determining the Laplacian of the phase function using a discrete Laplacian operator.
97. A method for displaying video data, the video data specifying video frames for display at a frame rate, the method comprising:
in real time, processing the video data to yield a sequence of phase-modulator control signals at the frame rate,
applying the phase modulator control signals to an illuminated two-dimensional spatial phase modulator, and
directing resulting phase-modulated light to a viewing area.
98. The method according to enumerated example embodiment 97 comprising further amplitude-modulating the phase-modulated light.

99. The method according to enumerated example embodiment 98 wherein further amplitude-modulating the phase-modulated light comprises controlling a spatial light modulator in a path of the phase-modulated light.
100. The method according to enumerated example embodiment 99 comprising computing a blur in the phase-modulated light and controlling the spatial light modulator to reduce the blur.
101. The method according to any one of enumerated example embodiments 97 to 100 wherein processing the video data comprises:
    establishing a mapping between points in the light pattern and corresponding points on the light modulator;
    using the mapping, deriving a phase function, p, that includes the control values by mapping the target light pattern into a coordinate space of the phase modulator; and
    processing the mapped target light pattern in the coordinate space of the phase modulator.
102. The method according to enumerated example embodiment 101 wherein processing the mapped target light pattern comprises optimizing a trial phase function based on comparisons of intensities in the mapped target light pattern at the points on the phase modulator to corresponding optical properties of the phase function in neighborhoods of the points.
103. The method according to enumerated example embodiment 102 wherein the corresponding optical properties comprise magnifications.
104. The method according to enumerated example embodiment 102 or 103 comprising determining the optical properties based on a Laplacian of the phase function at the corresponding points.
105. The method according to enumerated example embodiment 104 comprising determining the Laplacian of the phase function using a discrete Laplacian operator.
106. The method according to any one of enumerated example embodiments 97 to 102 wherein processing the video data is performed in a frequency domain.
107. The method according to enumerated example embodiment 106 wherein processing the video data comprises generating an optimization function; performing a Fourier transform on the optimization function generating the phase function in the frequency domain and performing an inverse Fourier transformation on the phase function.
108. The method according to enumerated example embodiment 107 comprising performing the Fourier transform in hardware configured to perform the Fourier transform.
109. The method according to any one of enumerated example embodiments 92 to 96 and 101 to 108 wherein the phase modulator has a maximum phase retardation and the method comprises subtracting a multiple of $2\pi$ from phase shifts of the phase function that exceed the maximum phase retardation of the phase modulator.
110. A method for controlling a phase modulator to display an image defined by image data, the method comprising:
    determining an objective function based on the image data;
    transforming the objective function into a frequency space;
    minimizing the transformed objective function in the frequency space to obtain a phase function in the frequency space; and
    inverse transforming the phase function to obtain a solution phase function relating the phase of the phase modulator to a position in two dimensions.
111. The method according to enumerated example embodiment 110 wherein transforming the objective function comprises computing a Fourier transform of the objective function.
112. The method according to enumerated example embodiment 111 comprising, before transforming, extending the image data to have periodic boundary conditions and basing the objective function on the extended image data.
113. The method according to enumerated example embodiment 112 wherein extending the image data comprises making a mirror image of the image data across each boundary of the image data.
114. The method according to any one of enumerated example embodiments 110 to 113 wherein the objective function is a least squares objective function.
115. The method according to any one of enumerated example embodiments 110 to 114 wherein the objective function includes a cost for deviating from an input argument.
116. The method according to any one of enumerated example embodiments 110 to 115 wherein the method is performed iteratively and in each of a plurality of iterations the input argument for the objective function is the solution phase function for a previous iteration.
117. The method according to enumerated example embodiment 116 comprising caching a Fourier transform of the solution phase function for the previous iteration and applying the cached Fourier transform of the solution phase function in a current iteration.
118. The method according to any one of enumerated example embodiments 110 to 117 wherein the objective function comprises a proximal operator given by:

$$\text{prox}_{\gamma F}(q) = (\gamma + A^T A)^{-1}(\gamma q + A^T b).$$

119. The method according to enumerated example embodiment 118 wherein evaluating the transformed objective function comprises determining $$\left( \frac{\mathcal{F}(b)\mathcal{F}(A)^* + \gamma \mathcal{F}(q)}{(1+\alpha)\mathcal{F}(A)^2 + \gamma} \right).$$

120. The method according to enumerated example embodiment 119 wherein $A = \hat{i}\nabla^2$.
121. The method according to any one of enumerated example embodiments 119 and 120 wherein $b = 1 - I_p^k(v)$.
122. The method according to any one of enumerated example embodiments 119 to 121 wherein $\alpha > 0$ is a regularization parameter.
123. The method according to any one of enumerated example embodiments 110 to 122 wherein the method comprises initializing the phase surface as a constant value.
124. The method according to any one of enumerated example embodiments 110 to 123 wherein evaluating the transformed objective function is performed in parallel for different points.
125. The method according to enumerated example embodiment 124 wherein evaluating is performed in a graphics processing unit.
126. The method according to any one of enumerated example embodiments 110 to 125 comprising displaying the image by controlling pixels of a phase modulator according to the solution phase function while illuminating the phase modulator.

127. The method according to enumerated example embodiment 126 comprising evenly illuminating the phase modulator with collimated light.
128. The method according to any one of enumerated example embodiments 126 to 127 wherein the phase modulator comprises an array of liquid crystal pixels and the method comprises setting control signals to the pixels according to the solution phase function.
129. The method according to enumerated example embodiment 128 wherein the phase modulator is a LCoS phase modulator.
130. The method according to enumerated example embodiment 110 wherein the phase modulator is a deformable mirror.
131. The method according to any one of enumerated example embodiments 126 to 130 wherein a maximum numerical aperture for points on the phase modulator is 0.21 or less.
132. The method according to any one of enumerated example embodiments 110 to 131 wherein the phase modulator has a maximum phase retardation and the method comprises subtracting a multiple of $2\pi$ from phase shifts of the phase function that exceed the maximum phase retardation of the phase modulator.
133. A method for controlling a phase modulator to display an image defined by image data, the method comprising:
    determining a fixed point iteration based on the image data;
    transforming the fixed point iteration into a frequency space;
    evaluating the fixed point iteration in the frequency space to obtain a phase function in the frequency space; and
    inverse transforming the phase function to obtain a solution phase function relating the phase of the phase modulator to a position in two dimensions.
134. The method according to enumerated example embodiment 133 wherein transforming the fixed point iteration comprises computing a Fourier transform of the fixed point iteration.
135. The method according to enumerated example embodiment 134 comprising, before transforming, extending the image data to have periodic boundary conditions and basing the fixed point iteration on the extended image data.
136. The method according to enumerated example embodiment 135 wherein extending the image data comprises making a mirror image of the image data across each boundary of the image data.
137. The method according to any one of enumerated example embodiments 133 to 136 wherein the fixed point iteration is a least squares fixed point iteration.
138. The method according to any one of enumerated example embodiments 133 to 137 wherein the fixed point iteration includes a cost for deviating from an input argument.
139. The method according to any one of enumerated example embodiments 133 to 138 wherein the method is performed iteratively and in each of a plurality of iterations the input argument for the fixed point iteration is the solution phase function for a previous iteration.
140. The method according to enumerated example embodiment 139 comprising caching a Fourier transform of the solution phase function for the previous iteration and applying the cached Fourier transform of the solution phase function in a current iteration.
141. The method according to any one of enumerated example embodiments 133 to 140 wherein the fixed point iteration comprises a proximal operator given by:

$$\mathrm{prox}_{\gamma F}(q)=(\gamma+A^TA)^{-1}(\gamma q+A^Tb).$$

142. The method according to enumerated example embodiment 141 wherein evaluating the transformed fixed point iteration comprises determining $$\left(\frac{\mathcal{F}(b)\mathcal{F}(A)^* + \gamma\mathcal{F}(q)}{(1+\alpha)\mathcal{F}(A)^2 + \gamma}\right).$$

143. The method according to enumerated example embodiment 142 wherein $A=\hat{I}\nabla^2$.
144. The method according to any one of enumerated example embodiments 142 and 143 wherein $b=1-I_p^k(v)$.
145. The method according to any one of enumerated example embodiments 143 to 144 wherein $\alpha>0$ is a regularization parameter.
146. The method according to any one of enumerated example embodiments 133 to 145 wherein the method comprises initializing the phase surface as a constant value.
147. The method according to any one of enumerated example embodiments 133 to 146 wherein evaluating the transformed fixed point iteration is performed in parallel for different points.
148. The method according to enumerated example embodiment 147 wherein evaluating is performed in a graphics processing unit.
149. The method according to any one of enumerated example embodiments 133 to 148 comprising displaying the image by controlling pixels of a phase modulator according to the solution phase function while illuminating the phase modulator.
150. The method according to enumerated example embodiment 17 comprising evenly illuminating the phase modulator with collimated light.
151. The method according to any one of enumerated example embodiments 149 to 150 wherein the phase modulator comprises an array of liquid crystal pixels and the method comprises setting control signals to the pixels according to the solution phase function.
152. The method according to enumerated example embodiment 151 wherein the phase modulator is a LCoS phase modulator.
153. The method according to enumerated example embodiment 151 wherein the phase modulator is a deformable mirror.
154. The method according to any one of enumerated example embodiments 149 to 153 wherein a maximum numerical aperture for points on the phase modulator is 0.21 or less.
155. The method according to any one of enumerated example embodiments 133 to 154 wherein the phase modulator has a maximum phase retardation and the method comprises subtracting a multiple of $2\pi$ from phase shifts of the phase function that exceed the maximum phase retardation of the phase modulator.
156. Apparatus for generating control values for a phase modulator from image data defining a target light pattern, the apparatus comprising a data processor in communication with the phase modulator, the data processor configured to:

establish a mapping between points in the light pattern and corresponding points on the phase modulator;

using the mapping, derive a phase function, p, that includes the control values by mapping the target light pattern into a coordinate space of the phase modulator; and process the mapped target light pattern in the coordinate space of the phase modulator.

157. Apparatus according to enumerated example embodiment 156 wherein the data processor being configured to process the mapped target light pattern comprises the data processor being configured to optimize a trial phase function based on comparisons of intensities in the mapped target light pattern at the points on the phase modulator to corresponding optical properties of the phase function in neighborhoods of the points.

158. Apparatus according to enumerated example embodiment 157 wherein the corresponding optical properties comprise magnifications.

159. Apparatus according to any one of enumerated example embodiments 157 and 158 wherein the data processor is configured to determine the optical properties based on a Laplacian of the phase function at the corresponding points.

160. Apparatus according to enumerated example embodiment 159 wherein the data processor is configured to determine the Laplacian of the phase function using a discrete Laplacian operator.

161. Apparatus for displaying video data, the video data specifying video frames for display at a frame rate, the apparatus comprising a data processor configured to:
in real time, process the video data to yield a sequence of phase-modulator control signals at the frame rate,
apply the phase modulator control signals to an illuminated two-dimensional spatial phase modulator, and
control the spatial phase modulator to direct resulting phase-modulated light to a viewing area.

162. Apparatus according to enumerated example embodiment 161 wherein the data processor is configured to control a spatial light modulator in a path of the phase-modulated light to amplitude-modulate the phase-modulated light.

163. Apparatus according to enumerated example embodiment 162 wherein the data processor is configured to compute a blur in the phase-modulated light and control the spatial light modulator to reduce the blur.

164. Apparatus according to any one of enumerated example embodiments 161 to 163 wherein the data processor being configured to process the video data comprises the data processor being configured to:
establish a mapping between points in the light pattern and corresponding points on the light modulator;
using the mapping, derive a phase function, p, that includes the control values by mapping the target light pattern into a coordinate space of the phase modulator; and
process the mapped target light pattern in the coordinate space of the phase modulator.

165. Apparatus according to enumerated example embodiment 164 wherein the data processor being configured to process the mapped target light pattern comprises the data processor being configured to optimize a trial phase function based on comparisons of intensities in the mapped target light pattern at the points on the phase modulator to corresponding optical properties of the phase function in neighborhoods of the points.

166. Apparatus according to enumerated example embodiment 165 wherein the corresponding optical properties comprise magnifications.

167. Apparatus according to enumerated example embodiment 165 or 166 wherein the data processor is configured to determine the optical properties based on a Laplacian of the phase function at the corresponding points.

168. Apparatus according to enumerated example embodiment 167 wherein the data processor is configured to determine the Laplacian of the phase function using a discrete Laplacian operator.

169. Apparatus according to any one of enumerated example embodiments 161 to 165 wherein the data processor is configured to process the video data in a frequency domain.

170. Apparatus according to enumerated example embodiment 169 wherein the data processor being configured to process the video data comprises the data processor being configured to:
generate an optimization function;
generate the phase function in the frequency domain by performing a Fourier transform on the optimization function; and
perform an inverse Fourier transformation on the phase function in the frequency domain.

171. Apparatus according to enumerated example embodiment 170 comprising hardware configured to perform the Fourier transform and the data processor is configured to control the hardware to perform the Fourier transform.

172. Apparatus according to any one of enumerated example embodiments 161 to 165 and 169 to 171 wherein the phase modulator has a maximum phase retardation and the data processor is configured to subtract a multiple of $2\pi$ from phase shifts of the phase function that exceed the maximum phase retardation of the phase modulator.

173. Apparatus for controlling a phase modulator to display an image defined by image data, the method comprising:
determining an objective function based on the image data;
transforming the objective function into a frequency space;
minimizing the transformed objective function in the frequency space to obtain a phase function in the frequency space; and
inverse transform the phase function to obtain a solution phase function relating the phase of the phase modulator to a position in two dimensions.

174. Apparatus according to enumerated example embodiment 173 wherein the data processor being configured to transform the objective function comprises the data processor being configured to compute a Fourier transform of the objective function.

175. Apparatus according to enumerated example embodiment 174 wherein the data processor is configured to, before transforming, extend the image data to have periodic boundary conditions and base the objective function on the extended image data.

176. Apparatus according to enumerated example embodiment 175 wherein the data processor being configured to extend the image data comprises the data processor being configured to make a mirror image of the image data across each boundary of the image data.

177. Apparatus according to any one of enumerated example embodiments 173 to 176 wherein the objective function is a least squares objective function.

178. Apparatus according to any one of enumerated example embodiments 173 to 177 wherein the objective function includes a cost for deviating from an input argument.
179. Apparatus according to any one of enumerated example embodiments 173 to 178 wherein the data processor is configured to iteratively determine the objective function, transform the objective function, and evaluate the transformed objective function, and in each of a plurality of iterations the input argument for the objective function is the solution phase function for a previous iteration.
180. Apparatus according to enumerated example embodiment 179 wherein the data processor is configured to cache a Fourier transform of the solution phase function for the previous iteration and apply the cached Fourier transform of the solution phase function in a current iteration.
181. Apparatus according to any one of enumerated example embodiments 173 to 180 wherein the objective function comprises a proximal operator given by:

$$\text{prox}_{\gamma F}(q)=(\gamma+A^T A)^{-1}(\gamma q+A^T b).$$

182. Apparatus according to enumerated example embodiment 181 wherein the data processor being configured to evaluate the transformed objective function comprises the data processor being configured to determine $$\left(\frac{\mathcal{F}(b)\mathcal{F}(A)^* + \gamma \mathcal{F}(q)}{(1+\alpha)\mathcal{F}(A)^2 + \gamma}\right).$$

183. Apparatus according to enumerated example embodiment 182 wherein $A=f\nabla^2$.
184. Apparatus according to enumerated example embodiment 182 or 183 wherein $b=1-I_p^k(v)$.
185. Apparatus according to any one of enumerated example embodiments 182 to 184 wherein $\alpha>0$ is a regularization parameter.
186. Apparatus according to any one of enumerated example embodiments 173 to 185 wherein the data processor is configured to initializing the phase surface as a constant value.
187. Apparatus according to any one of enumerated example embodiments 173 to 186 wherein the data processor is configured to evaluate the transformed objective function in parallel for different points.
188. Apparatus according to enumerated example embodiment 187 wherein the data processor comprises a graphics processing unit and the graphics processing unit evaluates the transformed objective function.
189. Apparatus according to any one of enumerated example embodiments 173 to 188 comprising the phase modulator and a light source for projecting light on the phase modulator, the data processor configured to control the phase modulator to display the image by controlling pixels of the phase modulator according to the solution phase function while controlling the light source to illuminate the phase modulator.
190. Apparatus according to enumerated example embodiment 189 wherein the light source is configured to evenly illuminate the phase modulator with collimated light.
191. Apparatus according to any one of enumerated example embodiments 189 to 190 wherein the phase modulator comprises an array of liquid crystal pixels and the data processor is configured to set control signals to the pixels according to the solution phase function.
192. Apparatus according to enumerated example embodiment 191 wherein the phase modulator is a LCoS phase modulator.
193. Apparatus according to enumerated example embodiment 19 wherein the phase modulator is a deformable mirror.
194. Apparatus according to any one of enumerated example embodiments 189 to 193 wherein a maximum numerical aperture for points on the phase modulator is 0.21 or less.
195. Apparatus according to any one of enumerated example embodiments 173 to 194 wherein the phase modulator has a maximum phase retardation and the processor is configured to subtract a multiple of $2\pi$ from any phase shifts of the phase function that exceed the maximum phase retardation of the phase modulator.
196. Apparatus for controlling a phase modulator to display an image defined by image data, the apparatus comprising a data processor in communication with the phase modulator, the data processor configured to:
   determine a fixed point iteration based on the image data;
   transform the fixed point iteration into a frequency space;
   evaluate the fixed point iteration in the frequency space to obtain a phase function in the frequency space; and
   inverse transform the phase function to obtain a solution phase function relating the phase of the phase modulator to a position in two dimensions.
197. Apparatus according to enumerated example embodiment 196 wherein the data processor being configured to transform the fixed point iteration comprises the data processor being configured to compute a Fourier transform of the fixed point iteration.
198. Apparatus according to enumerated example embodiment 197 wherein the data processor is configured to, before transforming, extend the image data to have periodic boundary conditions and base the fixed point iteration on the extended image data.
199. Apparatus according to enumerated example embodiment 198 wherein the data processor being configured to extend the image data comprises the data processor being configured to make a mirror image of the image data across each boundary of the image data.
200. Apparatus according to any one of enumerated example embodiments 196 to 199 wherein the fixed point iteration is a least squares fixed point iteration.
201. Apparatus according to any one of enumerated example embodiments 196 to 200 wherein the fixed point iteration includes a cost for deviating from an input argument.
202. Apparatus according to any one of enumerated example embodiments 196 to 201 wherein the data processor is configured to iteratively determine the fixed point iteration, transform the fixed point iteration, and evaluate the transformed fixed point iteration, and in each of a plurality of iterations the input argument for the fixed point iteration is the solution phase function for a previous iteration.
203. Apparatus according to enumerated example embodiment 202 wherein the data processor is configured to cache a Fourier transform of the solution phase function for the previous iteration and apply the cached Fourier transform of the solution phase function in a current iteration.
204. Apparatus according to any one of enumerated example embodiments 196 to 203 wherein the fixed point iteration comprises a proximal operator given by:

$$\text{prox}_{\gamma F}(q)=(\gamma+A^T A)^{-1}(\gamma q+A^T b).$$

205. Apparatus according to enumerated example embodiment 204 wherein the data processor being configured to evaluate the transformed fixed point iteration comprises the data processor being configured to determine $$\left(\frac{\mathcal{F}(b)\mathcal{F}(A)^* + \gamma\mathcal{F}(q)}{(1+\alpha)\mathcal{F}(A)^2 + \gamma}\right).$$

206. Apparatus according to enumerated example embodiment 205 wherein $A=\hat{\imath}\nabla^2$.
207. Apparatus according to enumerated example embodiment 205 or 206 wherein $b=1-I_p^k(v)$.
208. Apparatus according to any one of enumerated example embodiments 205 to 207 wherein $\alpha>0$ is a regularization parameter.
209. Apparatus according to any one of enumerated example embodiments 196 to 208 wherein the data processor is configured to initializing the phase surface as a constant value.
210. Apparatus according to any one of enumerated example embodiments 196 to 209 wherein the data processor is configured to evaluate the transformed fixed point iteration in parallel for different points.
211. Apparatus according to enumerated example embodiment 210 wherein the data processor comprises a graphics processing unit and the graphics processing unit evaluates the transformed fixed point iteration.
212. Apparatus according to any one of enumerated example embodiments 196 to 211 comprising the phase modulator and a light source for projecting light on the phase modulator, the data processor configured to control the phase modulator to display the image by controlling pixels of the phase modulator according to the solution phase function while controlling the light source to illuminate the phase modulator.
213. Apparatus according to enumerated example embodiment 212 wherein the light source is configured to evenly illuminate the phase modulator with collimated light.
214. Apparatus according to any one of enumerated example embodiments 212 to 213 wherein the phase modulator comprises an array of liquid crystal pixels and the data processor is configured to set control signals to the pixels according to the solution phase function.
215. Apparatus according to enumerated example embodiment 214 wherein the phase modulator is a LCoS phase modulator.
216. Apparatus according to enumerated example embodiment 214 wherein the phase modulator is a deformable mirror.
217. Apparatus according to any one of enumerated example embodiments 212 to 216 wherein a maximum numerical aperture for points on the phase modulator is 0.21 or less.
218. Apparatus according to any one of enumerated example embodiments 1 to 22 wherein the phase modulator has a maximum phase retardation and the processor is configured to subtract a multiple of $2\pi$ from any phase shifts of the phase function that exceed the maximum phase retardation of the phase modulator.
219. A method for controlling a phase modulator to display an image defined by image data, the method comprising:
    determining a proximal operator of an objective function based on the image data;
    transforming the proximal operator into a frequency space;
    evaluating the transformed proximal operator in the frequency space to obtain a phase function in the frequency space and inverse transforming the phase function to obtain a solution phase function relating a phase of the phase modulator to position in two dimensions.
220. The method according to enumerated example embodiment 219 wherein transforming the proximal operator comprises computing a Fourier transform of the proximal operator.
221. The method according to enumerated example embodiment 220 comprising, before transforming, extending the image data to have periodic boundary conditions and basing the proximal operator on the extended image data.
222. The method according to enumerated example embodiment 221 wherein extending the image data comprises making a mirror image of the image data across each boundary of the image data.
223. The method according to any one of enumerated example embodiments 219 to 222 wherein the objective function is a least squares objective function.
224. The method according to any one of enumerated example embodiments 219 to 223 wherein the proximal operator includes a cost for deviating from an input argument.
225. The method according to any one of enumerated example embodiments 219 to 224 wherein the method is performed iteratively and in each of a plurality of iterations the input argument for the proximal operator is the solution phase function for a previous iteration.
226. The method according to enumerated example embodiment 225 comprising caching a Fourier transform of the solution phase function for the previous iteration and applying the cached Fourier transform of the solution phase function in a current iteration.
227. The method according to any one of enumerated example embodiments 219 to 226 wherein the proximal operator is given by:

$$\text{prox}_{\gamma F}(q) = (\gamma + A^T A)^{-1}(\gamma q + A^T b).$$

228. The method according to enumerated example embodiment 227 wherein evaluating the transformed proximal operator comprises determining $$\left(\frac{\mathcal{F}(b)\mathcal{F}(A)^* + \gamma\mathcal{F}(q)}{(1+\alpha)\mathcal{F}(A)^2 + \gamma}\right).$$

229. The method according to enumerated example embodiment 226 wherein $A=\hat{\imath}\nabla^2$.
230. The method according to any one of enumerated example embodiments 228 and 229 wherein $b=1-I_p^k(v)$.
231. The method according to any one of enumerated example embodiments 228 to 230 wherein $\alpha>0$ is a regularization parameter.
232. The method according to any one of enumerated example embodiments 219 to 231 wherein the method comprises initializing the phase surface as a constant value.
233. The method according to any one of enumerated example embodiments 219 to 232 wherein evaluating the transformed proximal operator is performed in parallel for different points.
234. The method according to enumerated example embodiment 233 wherein evaluating is performed in a graphics processing unit.
235. The method according to any one of enumerated example embodiments 219 to 234 comprising displaying the image by controlling pixels of a phase modulator according to the solution phase function while illuminating the phase modulator.
236. The method according to enumerated example embodiment 235 comprising evenly illuminating the phase modulator with collimated light.
237. The method according to any one of enumerated example embodiments 235 to 236 wherein the phase modulator comprises an array of liquid crystal pixels and the method comprises setting control signals to the pixels according to the solution phase function.
238. The method according to enumerated example embodiment 237 wherein the phase modulator is a LCoS phase modulator.
239. The method according to enumerated example embodiment 237 wherein the phase modulator is a deformable mirror.
240. The method according to any one of enumerated example embodiments 235 to 239 wherein a maximum numerical aperture for points on the phase modulator is 0.21 or less.
241. The method according to any one of enumerated example embodiments 219 to 240 wherein the phase modulator has a maximum phase retardation and the method comprises subtracting a multiple of $2\pi$ from phase shifts of the phase function that exceed the maximum phase retardation of the phase modulator.
242. Apparatus for controlling a phase modulator to display an image defined by image data, the apparatus comprising a data processor in communication with the phase modulator, the data processor configured to:
determine a proximal operator of an objective function based on the image data;
transform the proximal operator into a frequency space;
evaluate the transformed proximal operator in the frequency space to obtain a phase function in the frequency space and inverse transform the phase function to obtain a solution phase function relating a phase of the phase modulator to position in two dimensions.
243. Apparatus according to enumerated example embodiment 242 wherein the data processor being configured to transform the proximal operator comprises the data processor being configured to compute a Fourier transform of the proximal operator.
244. Apparatus according to enumerated example embodiment 243 wherein the data processor is configured to, before transforming, extend the image data to have periodic boundary conditions and base the proximal operator on the extended image data.
245. Apparatus according to enumerated example embodiment 244 wherein the data processor being configured to extend the image data comprises the data processor being configured to make a mirror image of the image data across each boundary of the image data.
246. Apparatus according to any one of enumerated example embodiments 242 to 245 wherein the objective function is a least squares objective function.
247. Apparatus according to any one of enumerated example embodiments 242 to 246 wherein the proximal operator includes a cost for deviating from an input argument.
248. Apparatus according to any one of enumerated example embodiments 242 to 247 wherein the data processor is configured to iteratively determine the proximal operator, transform the proximal operator, and evaluate the transformed proximal operator, and in each of a plurality of iterations the input argument for the proximal operator is the solution phase function for a previous iteration.
249. Apparatus according to enumerated example embodiment 248 wherein the data processor is configured to cache a Fourier transform of the solution phase function for the previous iteration and apply the cached Fourier transform of the solution phase function in a current iteration.
250. Apparatus according to any one of enumerated example embodiments 242 to 249 wherein the proximal operator is given by:

$$\text{prox}_{\gamma F}(q)=(\gamma+A^T A)^{-1}(\gamma q+A^T b).$$

251. Apparatus according to enumerated example embodiment 250 wherein the data processor being configured to evaluate the transformed proximal operator comprises the data processor being configured to determine $$\left(\frac{\mathcal{F}(b)\mathcal{F}(A)^* + \gamma\mathcal{F}(q)}{(1+\alpha)\mathcal{F}(A)^2 + \gamma}\right).$$

252. Apparatus according to enumerated example embodiment 251 wherein $A=\hat{f}\nabla^2$,
253. Apparatus according to enumerated example embodiment 251 or 252 wherein $b=1-I_p^k(v)$.
254. Apparatus according to any one of enumerated example embodiments 251 to 253 wherein $\alpha>0$ is a regularization parameter.
255. Apparatus according to any one of enumerated example embodiments 242 to 254 wherein the data processor is configured to initializing the phase surface as a constant value.
256. Apparatus according to any one of enumerated example embodiments 242 to 255 wherein the data processor is configured to evaluate the transformed proximal operator in parallel for different points.
257. Apparatus according to enumerated example embodiment 256 wherein the data processor comprises a graphics processing unit and the graphics processing unit evaluates the transformed proximal operator.
258. Apparatus according to any one of enumerated example embodiments 242 to 257 comprising the phase modulator and a light source for projecting light on the phase modulator, the data processor configured to control the phase modulator to display the image by controlling pixels of the phase modulator according to the solution phase function while controlling the light source to illuminate the phase modulator.
259. Apparatus according to enumerated example embodiment 258 wherein the light source is configured to evenly illuminate the phase modulator with collimated light.
260. Apparatus according to any one of enumerated example embodiments 258 to 259 wherein the phase modulator comprises an array of liquid crystal pixels and the data processor is configured to set control signals to the pixels according to the solution phase function.
261. Apparatus according to enumerated example embodiment 260 wherein the phase modulator is a LCoS phase modulator.
262. Apparatus according to enumerated example embodiment 260 wherein the phase modulator is a deformable mirror.
263. Apparatus according to any one of enumerated example embodiments 258 to 262 wherein a maximum numerical aperture for points on the phase modulator is 0.21 or less.
264. Apparatus according to any one of enumerated example embodiments 242 to 264 wherein the phase modulator has a maximum phase retardation and the processor is configured to subtract a multiple of $2\pi$ from any phase shifts of the phase function that exceed the maximum phase retardation of the phase modulator.

265. A computer-readable medium including computer-readable software instructions configured to cause a data processor to perform the method of any one of the above method enumerated example embodiments.

266. Apparatus having any new and inventive feature, combination of features, or sub-combination of features as described herein.

267. Methods having any new and inventive steps, acts, combination of steps and/or acts or sub-combination of steps and/or acts as described herein.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. Apparatus for controlling a phase modulator to display a target light pattern defined by image data, the apparatus comprising a data processor in communication with the phase modulator, the data processor configured to:
   receive the image data as input;
   initialize a warped image based on the image data, the warped image warped from the target light pattern by distortions corresponding to a phase function p(x) representing a phase shift applied by the phase modulator for regions in the lens plane;
   refine the phase function and the warped image by performing a plurality of iterations wherein each of the plurality of iterations includes:
      a step of updating the phase function by performing an optimization which yields an updated phase function wherein the updated phase function reduces a difference measure between the warped image and the inverse of a magnification provided by the phase function at points in the warped image; and
      a step of warping the target light pattern onto the lens plane using a distortion u(x) produced by the updated phase function p(x) to yield an updated warped image; and
   generate control signals for the phase modulator based on the refined phase function.

2. Apparatus according to claim 1 wherein the difference measure comprises a sum of squares of differences between pixels of the warped image and inverses of the magnification at the points in the warped image.

3. Apparatus according to claim 1 wherein the step of updating the phase function comprises computing, by the data processor, differences between pixels of the warped image and corresponding values for $-1+f\cdot\nabla^2 p(x)$.

4. Apparatus according to claim 1 wherein the step of updating the phase function comprises computing, by the data processor, differences between pixels of the warped image and corresponding values for $1/(1+f\cdot\nabla^2 p(x))$.

5. Apparatus according to claim 1 wherein the step of updating the phase function comprises solving, by the data processor:

$$\hat{p}(x)=\mathrm{argmin}_{p(x)}\int_x (i_p(x)-1+f\cdot\nabla^2 p(x))^2 dx.$$

6. Apparatus according to claim 1 comprising a graphics processor unit and wherein the texture mapping operation is implemented on the graphics processor unit.

7. Apparatus according to claim 1 wherein the step of warping the target intensity in the image plane backwards onto the lens plane comprises computing, by the data processor:

$$i_p(x)=i(x+f\cdot\nabla p(x)).$$

8. Apparatus according to claim 1 wherein the data processor is configured to model blur in an image at the image plane and generate control values for an amplitude modulator that tend to compensate at least in part for the blur.

9. Apparatus according to claim 1 comprising the phase modulator and a light source for projecting light on the phase modulator, wherein the data processor is configured to generate the target light pattern by controlling the phase modulator according to the phase function and controlling the light source to illuminate the phase modulator with light.

10. Apparatus according to claim 9 wherein the light is broadband light.

11. Apparatus according to claim 10 wherein the broadband light is white light.

12. Apparatus according to claim 10 wherein the light is laser light.

13. Apparatus according to claim 9 wherein the light is collimated.

14. Apparatus according to claim 13 wherein the light source is configured to project light incident on the phase modulator in a direction normal to the lens plane.

15. Apparatus according to claim 9 wherein the target light pattern occupies an image area in the image plane and, from any point on the phase modulator, a light ray directed from the point to any point on a boundary of the image area forms an angle $\theta$ to a normal of the phase modulator wherein $|\theta|\leq 12°$.

16. Apparatus according to claim 9 wherein the phase modulator comprises a liquid crystal phase modulator.

17. Apparatus according to claim 16 wherein the phase modulator comprises a LCoS device.

18. Apparatus according to claim 9 wherein the phase modulator comprises a variable mirror.

19. Apparatus according to claim 1 wherein the target light pattern comprises one or more bright spots of light and the data processor is configured to control the phase function applied to the phase modulator to cause the one or more bright spots of light to move.

20. Apparatus according to claim 1 wherein the image data comprises video data having a frame rate of at least 20 frames per second wherein the video data provides a different target light pattern for each frame and the data processor is configured to calculate a different phase function for each frame in real time.

21. Apparatus according to claim 1 wherein the data processor is configured to refine the phase function and the warped image in 10 or fewer iterations.

22. Apparatus according to claim 1 comprising one or more graphics processor units wherein the data processor is configured to execute one or more steps of refining the phase function and the warped image in parallel in the one or more graphics processor units.

23. Apparatus according to claim 1 wherein the data processor is configured to perform at least some steps of refining the phase function and the warped image in a frequency domain.

24. Apparatus according to claim 23 wherein the data processor is configured to: perform a Fourier transform on the warped image, generate the phase function in the frequency domain using the Fourier transform of the warped image and perform an inverse Fourier transformation on the phase function.

25. Apparatus according to claim 24 comprising a hardware Fourier transform device wherein the data processor is configured to control the Fourier transform device to perform the Fourier transform.

26. Apparatus according to claim 1 comprising a spatial light modulator wherein the data processor is configured to apply control signals to the spatial light modulator to correct intensities of light modulated by the phase modulator.

27. Apparatus according to claim 23 wherein the data processor is configured to extend the image data to have periodic boundary conditions before performing the steps in the frequency domain.

28. Apparatus according to claim 27 wherein extending the image data comprises making a mirror image of the image data across each boundary of the image data.

29. Apparatus according to claim 1 comprising generating control signals for a spatial light modulator to correct intensities of light modulated by the phase modulator.

30. Apparatus according to claim 1 wherein the image data comprises video data, the target light pattern is defined for one of the frames of the image data and different target light patterns are defined in the image data for other frames of the image data.

* * * * *